(12) United States Patent
Wang

(10) Patent No.: US 10,859,476 B2
(45) Date of Patent: Dec. 8, 2020

(54) LIQUID PHASE CHROMATOGRAPH

(71) Applicant: Hunan Demeter Instruments Co. Ltd., Hunan (CN)

(72) Inventor: Feng Wang, Changsha (CN)

(73) Assignee: HUNAN DEMETER INSTRUMENTS CO., LTD., Changsha (CN)

( * ) Notice: Subject to any disclaimer, the term of this patent is extended or adjusted under 35 U.S.C. 154(b) by 366 days.

(21) Appl. No.: 15/531,706

(22) PCT Filed: Nov. 27, 2014

(86) PCT No.: PCT/CN2014/092379

§ 371 (c)(1),
(2) Date: Sep. 25, 2017

(87) PCT Pub. No.: WO2016/082154

PCT Pub. Date: Jun. 2, 2016

(65) Prior Publication Data

US 2018/0128720 A1    May 10, 2018

(51) Int. Cl.
*G01N 1/34* (2006.01)
*G01N 30/20* (2006.01)
(Continued)

(52) U.S. Cl.
CPC ............. *G01N 1/34* (2013.01); *B01D 15/163* (2013.01); *B01D 15/426* (2013.01); *G01N 30/20* (2013.01);
(Continued)

(58) Field of Classification Search
CPC combination set(s) only.
See application file for complete search history.

(56) References Cited

U.S. PATENT DOCUMENTS

2004/0178133 A1* 9/2004 Deguchi ............... G01N 30/20
210/198.2
2011/0303842 A1 12/2011 Nakano
(Continued)

FOREIGN PATENT DOCUMENTS

CN    104330502 A    2/2015
CN    204203173 U    3/2015
(Continued)

OTHER PUBLICATIONS

International Search Report issued in International Application No. PCT/CN2014/092379 dated Sep. 2, 2015, 4 pages.

*Primary Examiner* — Ryan B Huang
(74) *Attorney, Agent, or Firm* — Mauriel Kapouytian Woods LLP; Liang Huang; Michael Mauriel

(57) ABSTRACT

A liquid chromatography having an on-line cleaning function, comprising a first flow channel (L3), a second flow channel (L21), an analysis flow channel (L22) and waste liquid flow channels, further comprising a cleaning flow channel (L25), a direction switch valve (V1) and a multi-flow channel switch valve (V2), etc. The liquid chromatography changes the flow path of the liquid by changing the communication relationship between the two-position switch valves, thus realizes the on-line cleaning function for a first chromatographic column (C1), a middle chromatographic column (C2), a filter or a protector (B2) respectively, and realize the simultaneous on-line cleaning function for the first chromatographic column (C1) and the middle chromatographic column (C2).

21 Claims, 23 Drawing Sheets

(51) Int. Cl.
*G01N 30/88* (2006.01)
*B01D 15/16* (2006.01)
*B01D 15/42* (2006.01)
*G01N 30/60* (2006.01)
*G01N 35/10* (2006.01)
*G01N 30/40* (2006.01)
*G01N 30/46* (2006.01)
G01N 30/02 (2006.01)

(52) U.S. Cl.
CPC ........... *G01N 30/40* (2013.01); *G01N 30/463* (2013.01); *G01N 30/465* (2013.01); *G01N 30/88* (2013.01); *G01N 30/6039* (2013.01); *G01N 35/1097* (2013.01); *G01N 2030/027* (2013.01); *G01N 2030/402* (2013.01)

(56) References Cited

U.S. PATENT DOCUMENTS

2013/0333452 A1* 12/2013 Suzuki .................. G01N 30/24
73/64.56
2014/0166542 A1* 6/2014 Chawla .............. B01D 15/1871
208/309

FOREIGN PATENT DOCUMENTS

| CN | 204203174 U | 3/2015 |
| CN | 204203178 U | 3/2015 |
| JP | 2011122822 A | 6/2011 |

* cited by examiner

LIQUID PHASE CHROMATOGRAPH

TECHNICAL FIELD

The present invention belongs to the field of liquid chromatography, and particularly relates to a liquid chromatography having an on-line cleaning function.

BACKGROUND ART

The separation principle of a liquid chromatography (Liquid Chromatography, LC) is to perform separation by using the difference of allocation coefficients, adsorption capacities and other affinities of various to-be-separated substances in two phases. A chromatographic pump is used to allow a mobile phase containing a sample to pass by a stationary phase surface that is immobilized in a chromatographic column and insoluble with the mobile phase. When a mixture carried in the mobile phase flows by the stationary phase, the components in the mixture interact with the stationary phase.

Due to the difference in properties and structures of the components in the mixture, the retention times of the components retained by the stationary phase are different, and thus the components successively flow out from the stationary phase in a certain order. In combination with an appropriate post-column detection method, the separation and detection of the components in the mixture are achieved. The method has become an important separation and analysis technology in the fields of chemistry, medicine, industry, agriculture, commodity inspection, forensic examination, etc.

On the basis of conventional liquid chromatography, two-dimensional liquid chromatography (2D-LC) having on-line treatment or two-dimensional separation capability of samples is developed. The two-dimensional liquid chromatography is a separation system consisting of two serially connected chromatographic columns that have different separation mechanisms and are independent from each other. The samples enter an interface through the chromatographic column of the first-dimensional liquid phase and are switched to enter the chromatographic column of the second-dimensional liquid phase and a detector after being concentrated, captured or cut off. The two-dimensional liquid chromatography usually uses two different separation mechanisms to analyze the samples, that is, a complex mixture (e.g., peptide) is divided into single components using different characteristics of the samples, the characteristics include molecular sizes, isoelectric points, hydrophilia, charges, special intermolecular interaction (affinity), and the like, components that cannot be completely separated in a one-dimensional separation system can be better separated in the two-dimensional separation system, and thus the separation capacity and the resolution are greatly improved.

The existing conventional liquid chromatography has a common drawback with the two-dimensional liquid chromatography, namely cannot clean the chromatographic columns, filters, flow path pipelines or protection columns online. Due to impurities in the sample to be analyzed and other reasons, the impurities will be accumulated in the chromatographic column with the increase of the using time of the chromatographic column, resulting in a worse effect of the chromatographic column as time goes, thus the analysis accuracy is affected, and in severe cases, the chromatographic column may be blocked, resulting in use failure of the chromatographic column. In the prior art, the longer the chromatographic column is used, the dirtier the analyzed sample is, the higher the degradation speed is in general. Different deformation degrees of a chromatographic peak are caused by different variation degrees, and in severe cases, the collapse of a chromatographic system or an inaccurate measurement result may be caused, therefore the chromatographic column often needs to be cleaned after the sample is analyzed, in addition, insoluble particles brought from the sample or the mobile phase may block the pipeline, the filter or the protector, resulting in pipeline breakage, system overpressure or other problems.

Especially in the two-dimensional liquid chromatography, the first-dimensional chromatographic column is usually used for the primary separation of "very dirty" samples (such as plasma, crude extracts of traditional Chinese medicine, crude extracts of animal and plant tissues and the like), the larger the number of the analyzed samples and the more the times of analysis, the more the substances that cannot be eluted by the mobile phase used are accumulated on the chromatographic column, the samples may also contain tiny insoluble particles, therefore the chromatographic system is prone to the blockage situation, the degradation speed of the chromatographic column is very high, and the service life is less than 1000 times in general. Accordingly, the insoluble particles in the samples need to be intercepted, and the degraded chromatographic column needs aperiodic cleaning. In addition, after the first-dimensional chromatographic column is failed, dirty substances are easily transferred to the later-stage chromatographic column, resulting in a fault of the second-dimensional chromatographic system, and thus the later-stage chromatographic column also needs to be cleaned aperiodically; and moreover, the more "dirty" the samples are, the easier the insoluble particles are separated out in the pipeline of the liquid chromatography, resulting in serious system blockage, even system collapse.

One of the existing techniques for solving the above problems is to add a guard column or a filter to a chromatograph sample injector and a chromatographic column, and when the effect of the guard column or the filter is deteriorated or when the system pressure is increased, the operation of the liquid chromatography is stopped, and the ineffective guard column or filter is replaced. In this technical solution, the material needs to be replaced, resulting in an increase of the cost; in addition, the analysis must be stopped before the replacement work is performed, which affects the working efficiency of the liquid chromatography; moreover, manual operation is required, which hinder the implementation of high automation of the chromatograph.

Another existing technique for solving the above problems is to stop the analysis after the completion of sample analysis, and flush the liquid chromatography and the chromatographic column by using a mobile phase with relatively high elution ability so as to flush a part of impurities. However, this method has no effect on the failure of the chromatographic column due to the retention of very strong impurities and tiny particles; in addition, it takes a long time; and furthermore, the highly automatic operation of the chromatograph cannot be simultaneously achieved during the sample analysis.

CONTENTS OF INVENTION

In view of the shortcomings of the prior art, the present invention aims at achieving the following several objectives:

The first objective of the present invention is to realize an on-line cleaning function for a first chromatographic column.

The second objective of the present invention is to realize the on-line cleaning function for a middle chromatographic column.

The third objective of the present invention is to realize the simultaneous on-line cleaning function for the first chromatographic column and the middle chromatographic column.

The fourth objective of the present invention is to realize the on-line cleaning function for a filter or a protector.

The fifth objective of the present invention is to modulate a first mobile phase to change the pH, the ion strength or the solvent proportion of the first mobile phase, so that compatible impurities on the first chromatographic column or the middle chromatographic column can be eluted, and on-line cleaning and modulation functions can be further realized.

To achieve the above objectives, the present invention adopts the following technical solution:

A liquid chromatography comprises:

a first flow channel connected with a sample injector, which conveys a first mobile phase;

a second flow channel, which conveys a second mobile phase;

an analysis flow channel, which separates and detects captured substances;

waste liquid flow channels, comprising a first waste liquid flow channel and a second waste liquid flow channel which discharges waste liquid;

a first pipeline and a second pipeline, respectively connected with one end and the other end of a first chromatographic column; a third pipeline and a fourth pipeline, respectively connected with one end and the other end of a middle chromatographic column;

the liquid chromatography further comprises a cleaning flow channel, which conveys a cleaning solution;

the liquid chromatography further comprises a direction switch valve and a multi-flow channel switch valve; the first pipeline and the second pipeline which respectively connected with one end and the other end of the first chromatographic column are arranged between the direction switch valve and the multi-flow channel switch valve; a middle communication pipeline is arranged between the direction switch valve and the multi-flow channel switch valve and is which directly communicates the direction switch valve with the multi-flow channel switch valve;

the direction switch valve comprises a plurality of interfaces, the first flow channel, the cleaning flow channel and the waste liquid flow channels are separately connected with any one interface of the direction switch valve, and a cleaning solution storage ring is arranged between any other two rest interfaces; and the multi-flow channel switch valve comprises a plurality of ports, a connection pipeline is connected between two ports of the multi-flow channel switch valve, and the third pipeline and the fourth pipeline which respectively connect with one end and the other end of the middle chromatographic column are arranged between the connection pipeline and another one of the rest ports; the second flow channel and the analysis flow channel are separately connected with any one of the rest ports of the multi-flow channel switch valve.

Further, the liquid chromatography further comprises:

a modulation flow channel I, which conveys modulation solution; the modulation flow channel I is connected with any one of the rest ports of the multi-flow channel switch valve; and a modulation flow channel II, wherein one end of the modulation flow channel II is connected with any one of the rest ports of the multi-flow channel switch valve, and the other end of the modulation flow channel II is connected with the first flow channel and is connected with the flow channel located behind the sample injector; or the other end of the modulation flow channel II is connected with the first pipeline which connects with the one end of the first chromatographic column.

Further, the liquid chromatography further comprises a rear switch valve, the rear switch valve is provided with a plurality of interfaces, and any two adjacent interfaces of the rear switch valve are connected in the first flow channel and are located on the flow channel between the sample injector and the modulation flow channel II; any other two adjacent interfaces of the rest interfaces are connected in the waste liquid flow channel; and a filter or a protector is connected between any other two rest interfaces.

A preferred connection mode is as follows: the direction switch valve comprises an interface a, an interface b, an interface c, an interface d, an interface e, an interface f, an interface g, an interface h, an interface i and an interface j, the cleaning solution storage ring is connected between the interface e and the interface j, the interface a is connected with the first flow channel, the interface b is connected with the first pipeline which connects with the one end of the first chromatographic column, the interface c and the interface f are separately connected with the waste liquid flow channels, the interface d is connected with the middle communication pipeline, the interface g is in a plugged state, and the interface i is connected with the cleaning flow channel.

A preferred connection mode is as follows: the multi-flow channel switch valve comprises a port a, a port b, a port c, a port d, a port e, a port f, a port g, a port h, a port i and a port j, the port c is in a plugged state, the port a is connected with the second pipeline which connects with the other end of the first chromatographic column, the port b is connected with the port f through the connection pipeline, the port i is connected with the third pipeline which connects with the one end of the middle chromatographic column, the fourth pipeline which connects with the other end of the middle chromatographic column is connected with the connection pipeline through a tee joint b, the port g is connected with the second flow channel, and the port h is connected with the analysis flow channel. When the modulation flow channel I is not connected with the multi-flow channel switch valve, the port e is in a plugged state. When the modulation flow channel I is connected with the multi-flow channel switch valve, the port e is connected with the modulation flow channel I.

A further preferred connection mode is as follows: the modulation flow channel I is connected with the port e of the multi-flow channel switch valve; and one end of the modulation flow channel II is connected with the port d of the multi-flow channel switch valve, and the other end of the modulation flow channel II is connected with the first flow channel through a tee joint a and is connected with the flow channel located behind the sample injector.

A further preferred connection mode is as follows: the rear switch valve is provided with a plurality of interfaces, and any two adjacent interfaces of the rear switch valve are connected in the first flow channel and are located between the sample injector and the tee joint a.

A further preferred connection mode is as follows: the rear switch valve is provided with an interface m, an interface n, an interface x, an interface y, an interface s and an interface r; the filter or the protector is connected between the interface n and the interface s; the first waste liquid flow channel and the first flow channel are each divided into two segments; the interface y is connected with one segment of the first waste liquid flow channel, and the interface x is connected with the other segment of the first waste liquid flow channel; and the interface m is connected with one segment of the first flow channel, and the interface r is connected with the other segment of the first flow channel.

Another technical solution of the present invention is as follows:

A liquid chromatography comprises:

a first flow channel connected with a sample injector, which conveys a first mobile phase;

a first pipeline and a second pipeline, respectively connected with one end and the other end of a first chromatographic column; a third pipeline and a fourth pipeline, respectively connected with one end and the other end of a middle chromatographic column;

a second flow channel, which conveys a second mobile phase;

an analysis flow channel, which separates and detects captured substances;

a fourth waste liquid flow channel, which discharges waste liquid;

the liquid chromatography further comprises a multi-flow channel switch valve provided with a plurality of ports, a connection pipeline is connected between any two ports of the multi-flow channel switch valve, and the third pipeline and the fourth pipeline which respectively connect with one end and the other end of the middle chromatographic column are arranged between the connection pipeline and another one of the rest ports; the first flow channel communicates with the first pipeline and the second pipeline which respectively connect with one end and the other end of the first chromatographic column, and the first flow channel is connected with one of the ports of the multi-flow channel switch valve; the second flow channel, the analysis flow channel and the fourth waste liquid flow channel are separately connected with any one of the rest ports of the multi-flow channel switch valve;

the liquid chromatography further comprises a modulation flow channel I which conveys modulation solution; the modulation flow channel I is connected with any one of the rest ports of the multi-flow channel switch valve; and the liquid chromatography further comprises a modulation flow channel II, wherein one end of the modulation flow channel II is connected with any one of the rest ports of the multi-flow channel switch valve, and the other end of the modulation flow channel II is connected with the first flow channel and is connected with the flow channel located behind the sample injector, or the other end of the modulation flow channel II is connected with the first pipeline which connects with the one end of the first chromatographic column.

A preferred connection mode is as follows:

the multi-flow channel switch valve is provided with a port a, a port b, a port c, a port d, a port e, a port f, a port g, a port h, a port i and a port j, the port c is in a plugged state, the port a is connected with the second pipeline which connects with the other end of the first chromatographic column, the port b is connected with the port f through the connection pipeline, the port i is connected with the third pipeline which connects with the one end of the middle chromatographic column, the fourth pipeline which connects with the other end of the middle chromatographic column is connected with the connection pipeline through a tee joint b, the port g is connected with the second flow channel, and the port h is connected with the analysis flow channel; the modulation flow channel I is connected with the port e of the multi-flow channel switch valve; and one end of the modulation flow channel II is connected with the port d of the multi-flow channel switch valve, and the other end of the modulation flow channel II is connected with the first flow channel through a tee joint a and is connected with the flow channel located behind the sample injector. The fourth waste liquid flow channel is connected with the port j of the multi-flow channel switch valve.

Yet another technical solution of the present invention is as follows:

A liquid chromatography comprises:

a first flow channel connected with a sample injector, which conveys a first mobile phase;

a second flow channel, which conveys a second mobile phase;

an analysis flow channel, which separates and detects captured substances;

a fifth waste liquid flow channel, which discharges waste liquid;

a first pipeline and a second pipeline, respectively connected with one end and the other end of a first chromatographic column; a third pipeline and a fourth pipeline, respectively connected with one end and the other end of a middle chromatographic column;

the liquid chromatography further comprises a rear switch valve and a multi-flow channel switch valve, and a communication pipeline which communicates the rear switch valve with the multi-flow channel switch valve;

the rear switch valve is provided with a plurality of interfaces, and any two adjacent interfaces of the rear switch valve are connected with the first flow channel and the first pipeline, the first pipeline is connected with the one end of the first chromatographic column; any other two adjacent interfaces of the rest interfaces are connected with the fifth waste liquid flow channel and one end of the communication pipeline; a filter or a protector is connected between any other two rest interfaces of the rear switch valve; and the multi-flow channel switch valve comprises a plurality of ports, a connection pipeline is connected between any two ports of the multi-flow channel switch valve, and the third pipeline and fourth pipeline which respectively connect with one end and the other end of the middle chromatographic column are arranged between the connection pipeline and another one of the rest ports; the second flow channel, the analysis flow channel, the other end of the communication pipeline and the second pipeline are separately connected with any one of the rest ports of the multi-flow channel switch valve, the second pipeline is connected with the other end of the first chromatographic column.

A preferred connection mode is as follows:

the rear switch valve is provided with an interface m, an interface n, an interface x, an interface y, an interface s and an interface r; the filter or the protector is connected between the interface n and the interface s; the interface in is connected with the first flow channel, the interface r is connected with the first pipeline which connects with the one end of the first chromatographic column, the filter or the protector is connected between the interface n and the interface s, the interface x is connected with the fifth waste liquid flow channel, and the interface y is connected with one end of the communication pipeline.

A further preferred connection mode is as follows:

the multi-flow channel switch valve is provided with a port a, a port b, a port c, a port d, a port e, a port f, a port g, a port h, a port i and a port j, the port c and the port e are in a plugged state, the port a is connected with the second pipeline which connects with the other end of the first chromatographic column, the port b is connected with the port f through the connection pipeline, the port i is connected with the third pipeline which connects with the one end of the middle chromatographic column, the fourth pipeline which connects with the other end of the middle chromatographic column is connected with the connection pipeline through a tee joint b, the port g is connected with the second flow channel, the port h is connected with the analysis flow channel, and the port j is connected with the other end of the communication pipeline.

The cleaning solution can be any solution having a cleaning function for all impurities or a part of impurities on the chromatographic column, and the elution strength of the cleaning solution is preferably greater than that of the first mobile phase.

The modulation solution can be an acidic, neutral or alkaline solution, or a high-proportion organic solvent.

The first chromatographic column and the middle chromatographic column can be chromatographic columns with retention capacity or quantitative loops with loading capacity.

Unless otherwise stated, one of the ports or interfaces of the direction switch valve, the multi-flow channel switch valve and the rear switch valve is only connected with one pipeline in general. The direction switch valve, the multi-flow channel switch valve and the rear switch valve in the present invention are all two-position switch valves.

In addition to the ports or interfaces in a plugged state, the ports or interfaces having no connection pipeline are called rest ports or rest interfaces.

Compared with the prior art, the present invention has the following advantages: in a sample measurement process, by introducing the cleaning solution, changing the discharge direction of the impurities and modulating the elution ability of the mobile phase, the impurities or tiny insoluble particles accumulated in the chromatographic columns, the pipelines, the guard columns or the filters in the liquid chromatography can be removed online; and highly automatic operation of the liquid chromatography can be realized without manual detachment, components replacement or change of the cleaning conditions.

Figure 1:
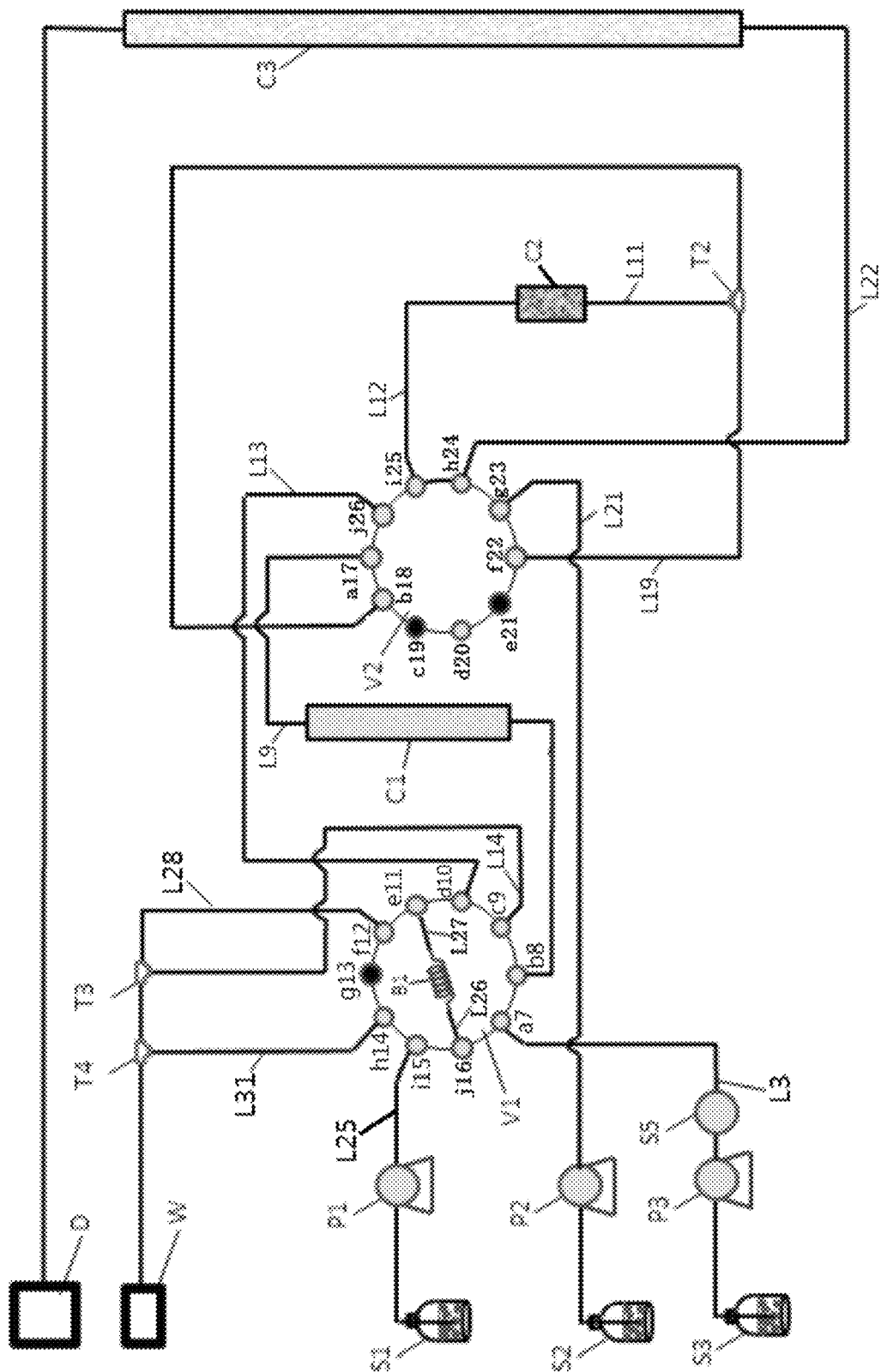
FIG. 1 is a structural schematic diagram of a liquid chromatography in embodiment 1.

wherein, S1 represents a cleaning solution, S2 represents a second mobile phase, S3 represents a first mobile phase, S4 represents a modulation solution, S5 represents a sample injector; P1 represents a liquid conveying pump I, P2 represents a liquid conveying pump II, P3 represents a liquid conveying pump III, P4 represents a liquid conveying pump IV, D represents a detector; W represents a waste liquid flow outlet; C1 represents a first chromatographic column; C2 represents a middle chromatographic column, C3 represents a second chromatographic column; V1 represents a direction switch valve; V2 represents a multi-flow channel switch valve; V3 represents a rear switch valve note: V1-V3 are all two-position switch valves); B1 represents a cleaning solution storage ring; B2 represents a filter or protector; T1 represents a tee joint a, T2 represents a tee joint b, T3 represents a tee joint c, and T4 represents a tee joint d;

L3 represents a first flow channel, L21 represents a second flow channel, L22 represents an analysis flow channel, L14 represents a first waste liquid flow channel, L28 represents a second waste liquid flow channel, L31 represents a third waste liquid flow channel, L25 represents a cleaning flow channel, L13 represents a middle communication pipeline, L19 represents a connection pipeline, L17 represents a modulation flow channel I, L18 represents a modulation flow channel II, L14' represents one segment of the first waste liquid flow channel L14, L15 represents the other segment of the first waste liquid flow channel L14, L3' represents one segment of the first flow channel L3, L7 represents the other segment of the first flow channel L3, L8 represents a first pipeline which connects with the one end of the first chromatographic column, L9 represents a second pipeline which connects with the other end of the first chromatographic column, L12 represents a third pipeline which connects with the one end of the middle chromatographic column, L11 represents a fourth pipeline which connects with the other end of the middle chromatographic column, L26 represents a cleaning solution storage ring connection pipeline I, L27 represents a cleaning solution storage ring connection pipeline II, L4 represents a filter or protector connection pipeline I, and L5 represents a filter or protector connection pipeline II; L32 represents a fourth waste liquid flow channel, L33 represents a fifth waste liquid flow channel, and L34 represents a communication pipeline;

in the direction switch valve V1: 7 represents an interface a, 8 represents an interface b, 9 represents an interface c, 10 represents an interface d, 11 represents an interface e, 12 represents an interface f, 13 represents an interface g, 14 represents an interface h, 15 represents an interface i, and 16 represents an interface j;

in the multi-flow channel switch valve V2: 17 represents a port a, 18 represents a port b, 19 represents a port c, 20 represents a port d, 21 represents a port e, 22 represents a port f, 23 represents a port g, 24 represents a port h, 25 represents a port i and 26 represents a port j;

in the rear switch valve V5: 1 represents an interface m, 2 represents an interface n, 3 represents an interface x, 4 represents an interface y, 5 represents an interface s and 6 represents an interface r; and in the figures, filled pot represent plugged states, and thick solid hues represent flow paths of the mobile phases.

SPECIFIC MODE FOR CARRYING OUT THE INVENTION

The present invention will be further illustrated below in combination with embodiments.

Embodiment 1

As shown in FIG. 1, a liquid chromatography comprises:

a first flow channel L3 connected with a sample injector S5, which conveys a first mobile phase S3;

a second flow channel L21, which conveys a second mobile phase S2;

a first chromatographic column C1, which performs primary separation on a sample;

a middle chromatographic column C2, which captures substances separated out by the first chromatographic column C1;

an analysis flow channel L22, comprising a second chromatographic column C3 and a detector D connected in sequence which further separate and detect the substances captured in the middle chromatographic column C2;

waste liquid flow channels L28, L31 and L14, which discharge waste liquid;

a cleaning flow channel L25, which conveys a cleaning solution S1, a direction switch valve V1 and a multi-flow channel switch valve V2; the first chromatographic column C1 is connected between the direction switch valve V1 and the multi-flow channel switch valve V2; a middle communication pipeline L13 is arranged between the direction switch valve V1 and the multi-flow channel switch valve V2 which directly communicates the direction switch valve V1 with the multi-flow channel switch valve V2;

the direction switch valve V1 comprises an interface a7, an interface b8, an interface c9, an interface d10, an interface e11, an interface f12, an interface g13, an interface h14, an interface i15 and an interface j16, a cleaning solution storage ring B1 is connected between the interface e11 and the interface j16, the interface a7 is connected with the first flow channel L3, the interface b8 is connected with first pipeline L8 which connects with the one end of the first chromatographic column C1, the interface c9, the interface 112 and the interface h14 are separately connected with the waste liquid flow channels, the interface d10 is connected with the middle communication pipeline L13, the interface g13 is in a plugged state, and the interface i15 is connected with the cleaning flow channel L25.

The multi-flow channel switch valve V2 comprises a port a17, a port b18, a port c19, a port d20, a port e21, a port f22, a port g23, a port h24, a port i25 and a port j26, the port c19 and the port e21 are in a plugged state, the port all is connected with the second pipeline L9 which connects with the other end of the first chromatographic column C1, the port b18 is connected with the port 122 through a connection pipeline L19, the port i25 is connected with the third pipeline L12 which connects with the one end of the middle chromatographic column C2, the fourth pipeline L11 which connects with the other end of the middle chromatographic column C2 is connected with the connection pipeline L19 through a tee joint T2, the port g23 is connected with the second flow channel L21, and the port h24 is connected with the analysis flow channel L22.

Figure 2:
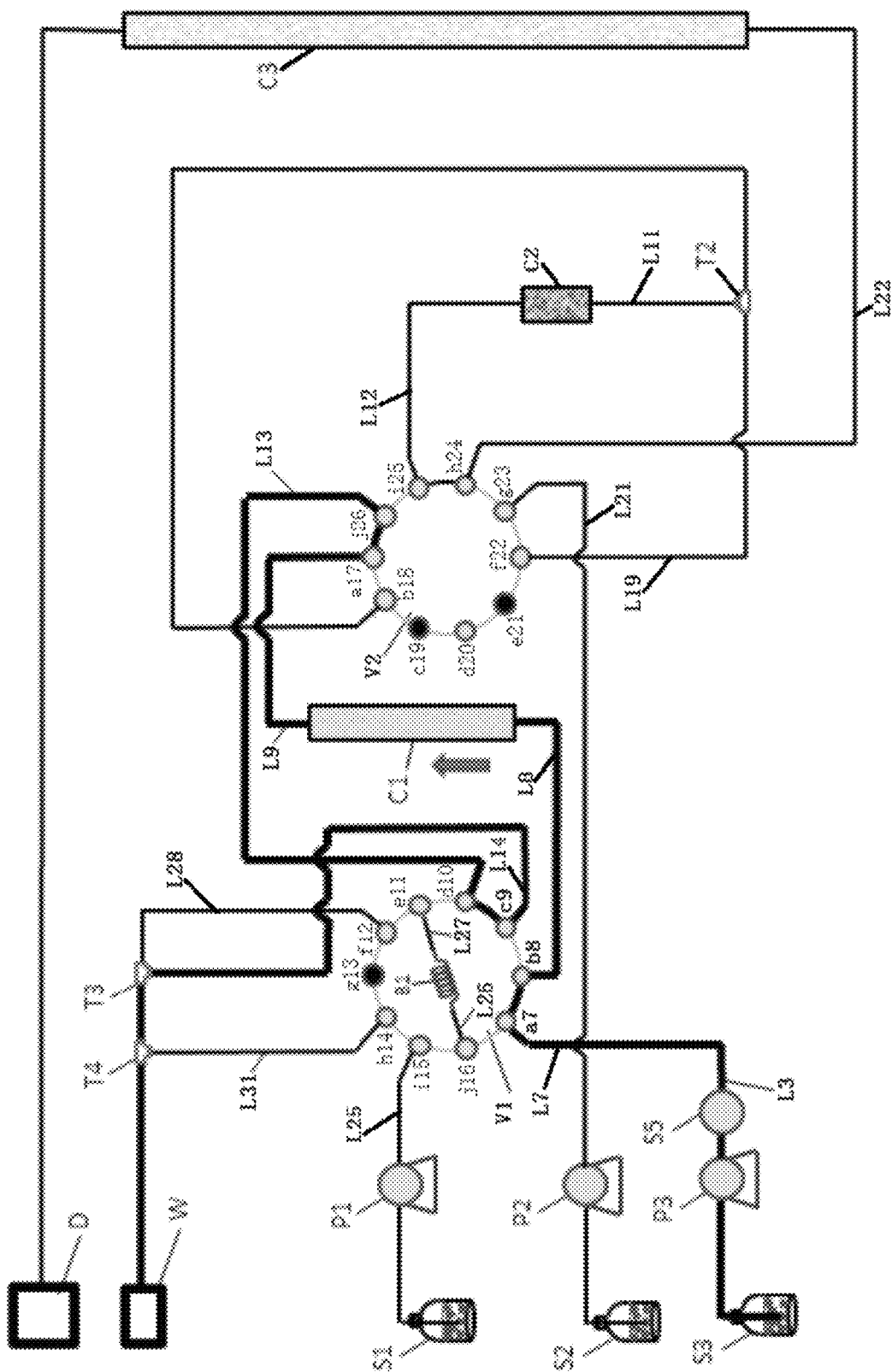
FIG. 2 is a working state diagram of the liquid chromatography in embodiment 1.

Regular Functions are Described as Follows:

1. A separation function of the first chromatographic column: as shown in FIG. 2, a conveying pump III P3 is started to convey the first mobile phase to the interface a7 of the direction switch valve V1, a test sample is introduced by the sample injector S5, the interface a7 and the interface b8 of the direction switch valve V1 are communicated, so that the first mobile phase flows across the first chromatographic column C1, the components in the test sample start to be separated under the separation mechanism of the first mobile phase and the first chromatographic column, then the first mobile phase containing the separated components flows to the port a17 of the multi-flow channel switch valve V2, the port a17 and the port j26 of the multi-flow channel switch valve V2 are communicated, so that the first mobile phase flows to the middle communication pipeline L13, then the interface d10 of the direction switch valve V1 is connected, and the interface d10 and the interface c9 are communicated, so that the first mobile phase flows to the first waste liquid flow channel L14 to be discharged. In the above process, after the sample is introduced into the first mobile phase, impurities that cannot be eluted in the sample are accumulated on the first chromatographic column, thereby gradually leading to failure of the first chromatographic column or the blockage of the system.

Figure 3:
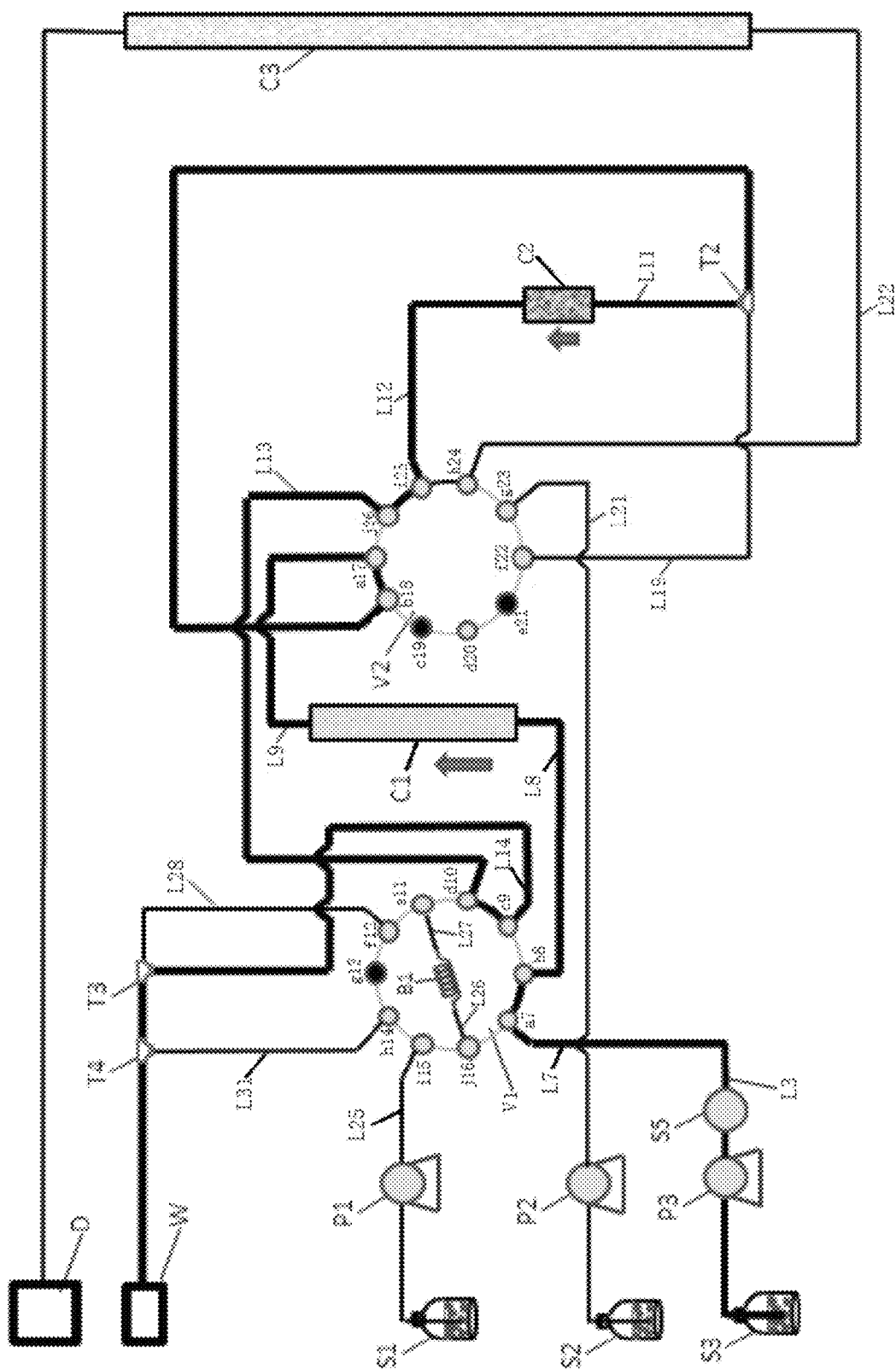
FIG. 3 is a working state diagram of the liquid chromatography in embodiment 1.

2. A capturing function of the middle chromatographic column: as shown in FIG. 3, the conveying pump III P3 is stared to convey the first mobile phase to the interface a7 of the direction switch valve V1, the interface a7 and the interface b8 of the direction switch valve V1 are communicated, so that the first mobile phase flows across the first chromatographic column C1, the test sample is introduced through the sample injector S5, the components in the test sample start to be separated under the separation mechanism of the first mobile phase and the first chromatographic column, then the first mobile phase containing the separated components flows to the port a17 of the multi-flow channel switch valve V2, the port a17 and the port b18 of the multi-flow channel switch valve V2 are communicated, so that the first mobile phase flows across the middle chromatographic column C2, a target component contained in the first mobile phase is captured by the middle chromatographic column C2 under the retention capacity of the middle chromatographic column C2 and cannot be taken away by the first mobile phase, the first mobile phase flows to the port i25, the port i25 and the port j26 are communicated, so that the first mobile phase flows to the middle communication pipeline L13, the interface d10 of the direction switch valve V1 is communicated, and the interface d10 and the interface c9 are communicated, so that the first mobile phase flows to the first waste liquid flow channel L14 to be discharged. In the above process, some impurities in the sample are retained on the middle chromatographic column together with the target component, and the impurities that cannot be eluted are accumulated on the middle chromatographic column, thereby gradually leading to the failure or blockage of the middle chromatographic column.

Figure 4:
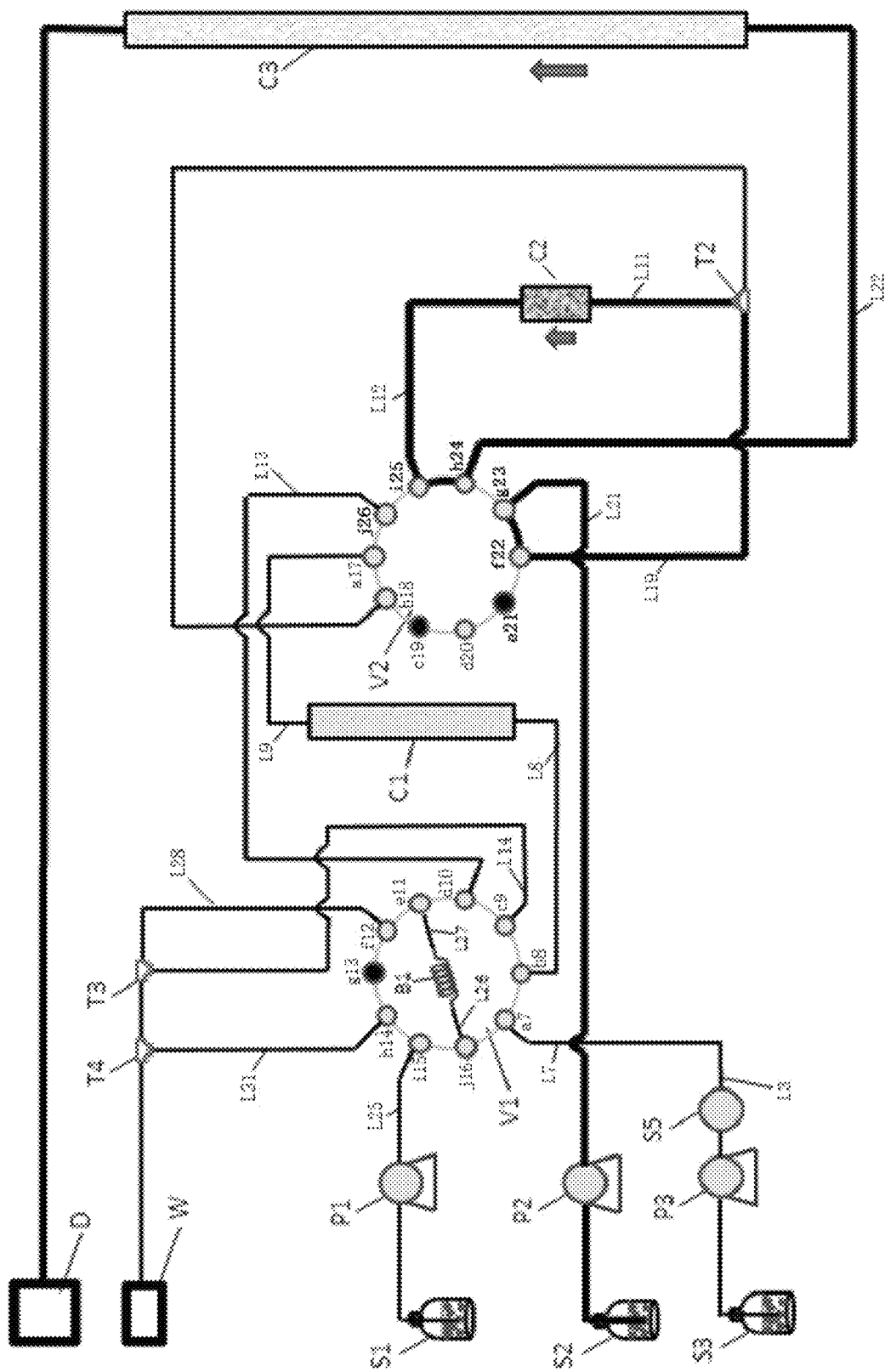
FIG. 4 is a working state diagram of the liquid chromatography in embodiment 1.

3. The separation function of the second chromatographic column: as shown in FIG. 4, a conveying pump II P2 is started to convey the second mobile phase to the port g23 of the multi-flow channel switch valve V2, the port g23 and the port I22 are communicated, so that the second mobile phase flows across the middle chromatographic column C2, the above-mentioned target component is eluted by the second mobile phase and is contained in the second mobile phase to flow to the port i25, the port i25 and the port h24 are communicated, so that the second mobile phase flows across the analysis flow channel L22, finally the target component is further separated under the separation mechanism of the second mobile phase and the second chromatographic column C3, and the target component is detected by the detector D after flowing out from the second chromatographic column C3.

Figure 5:
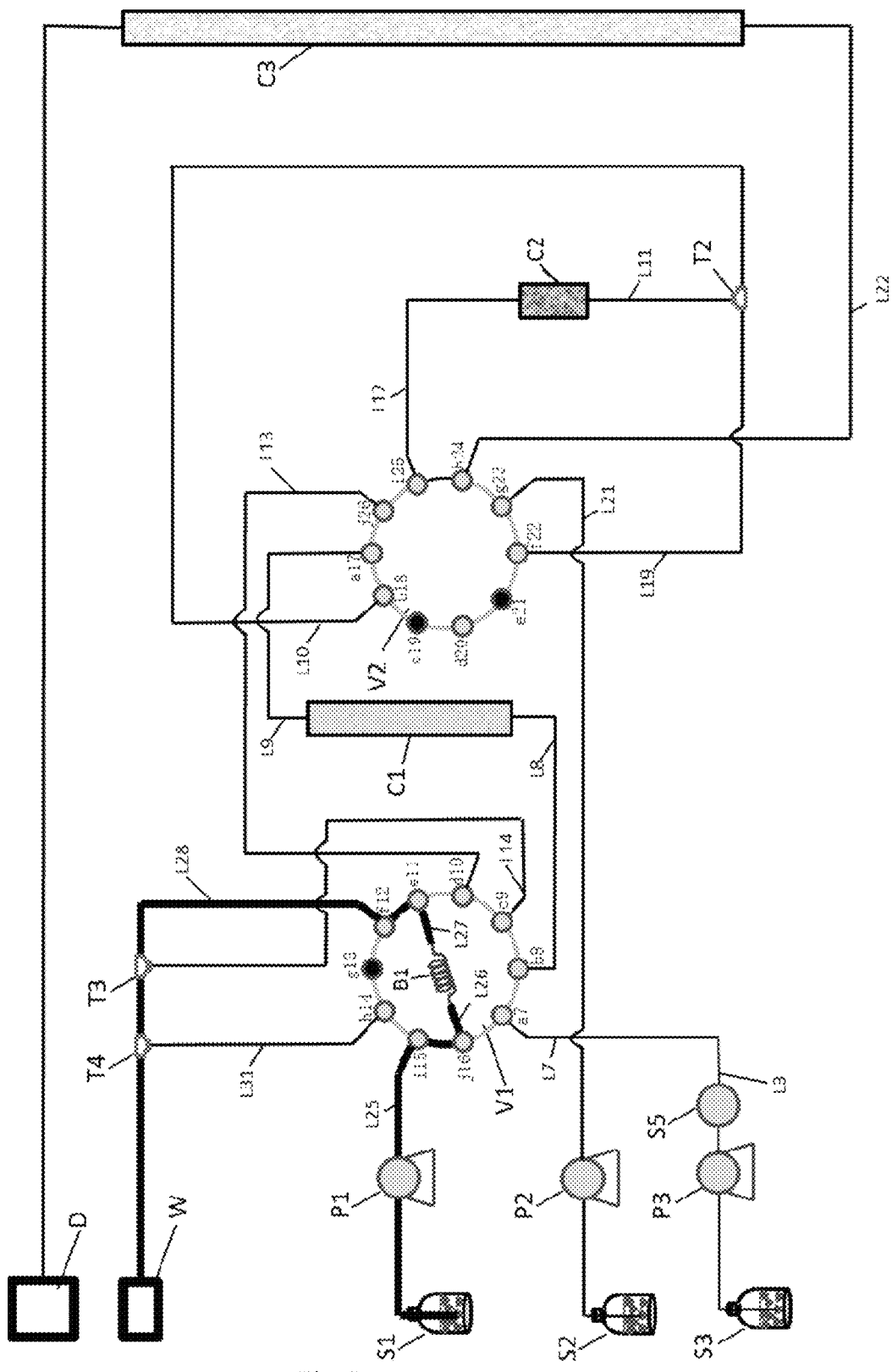
FIG. 5 is a working state diagram of the liquid chromatography in embodiment 1.

Specific Functions of the Present Invention are Described as Follows:

1. A storage function of the cleaning solution: as shown in FIG. 5, a conveying pump I P1 is started to convey the cleaning solution to a cleaning solution storage ring B1 of the direction switch valve V1, then the cleaning solution is discharged from the second waste liquid flow channel L28, and thus the cleaning solution storage ring B1 stores a part of the cleaning solution. The function can be executed within any rest time period without affecting the operation of the functions described in the above-mentioned regular functions, and requires no human intervention, and can be automatically accomplished.

Figure 6:
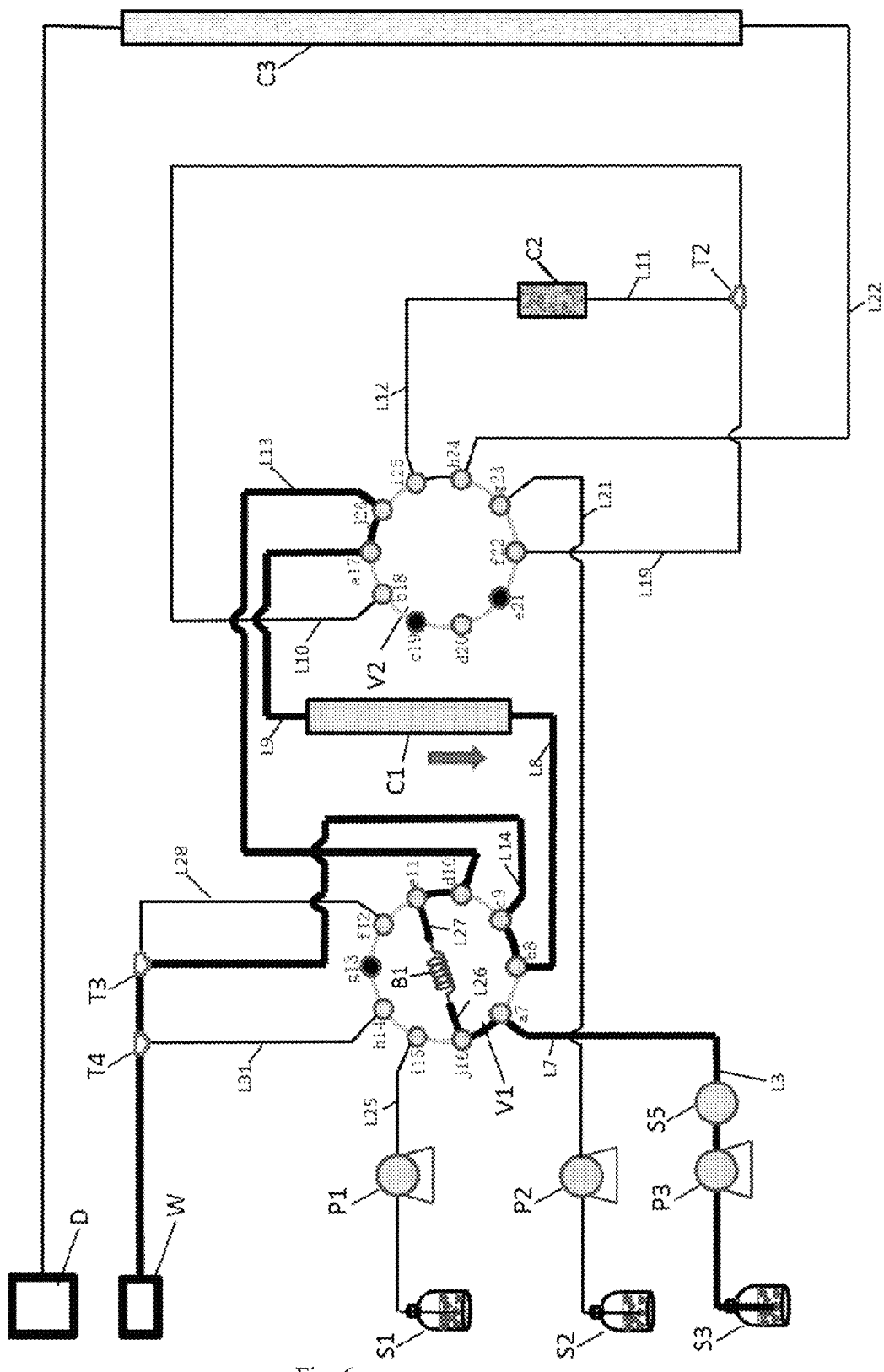
FIG. 6 is a working state diagram of the liquid chromatography in embodiment 1.

2. A cleaning function of the first chromatographic column: as shown in FIG. 6, the conveying pump 111 P3 is stared to convey the first mobile phase to the interface a7 of the direction switch valve V1, the interface a7 and the interface j16 are communicated, so that the first mobile phase pushes the cleaning solution in the cleaning solution storage ring B1 to flow to the interface e11, the interface e11 and the interface d10 are communicated, the cleaning solution is conveyed to the port j26 of the multi-flow channel switch valve V2 by the middle communication pipeline L13, the port j26 and the port aII are communicated, so that the cleaning solution reversely flows into the first chromatographic column C1 to clean the same and then flows into the interface b8 of the direction switch valve V1, and the interface b8 and the interface c9 are communicated, so that the cleaning solution is discharged from the first waste liquid flow channel L14. This function and the separation function of the second chromatographic column can be executed at the same time and can also be executed when the liquid chromatography is not used for analysis of the test sample.

Figure 7:
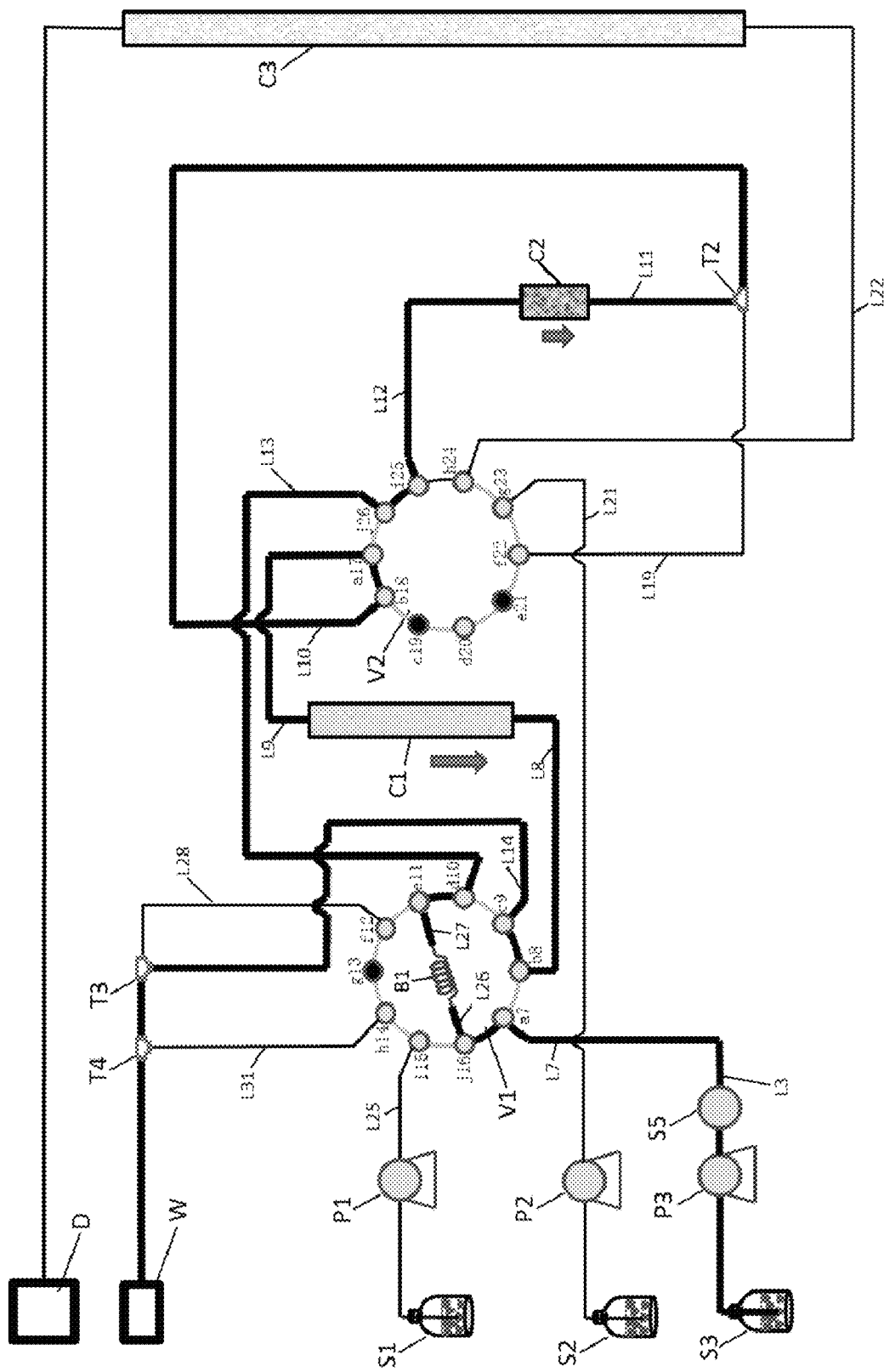
FIG. 7 is a working state diagram of the liquid chromatography in embodiment 1.

3. A simultaneous cleaning function of the first chromatographic column and the middle chromatographic column: as shown in FIG. 7, a conveying pump P3 is started to convey the first mobile phase to the interface a7 of the direction switch valve V1, the interface a7 and the interface j16 are communicated, so that the first mobile phase pushes the cleaning solution in the cleaning solution storage ring B1 to flow to the interface e11, the interface e11 and the interface d10 are communicated, the cleaning solution is conveyed to the port j26 of the multi-flow channel switch valve V2 by the middle communication pipeline L13, the port j26 and the port i25 are communicated, so that the cleaning solution flows into the middle chromatographic column C2 to clean the same and then flows into the port b18 of the multi-flow channel switch valve V2, the port b18 and the port a17 are communicated, so that the cleaning solution reversely flows into the first chromatographic column C1 to clean the same and then flows into the interface b8 of the direction switch valve V1, and the interface b8 and the interface c9 are communicated, so that the cleaning solution is discharged from the first waste liquid flow channel L14. This function and the separation function of the second chromatographic column can be executed at the same time and can also be executed when the liquid chromatography is not used for analysis of the test sample.

Embodiment 2

Figure 8:
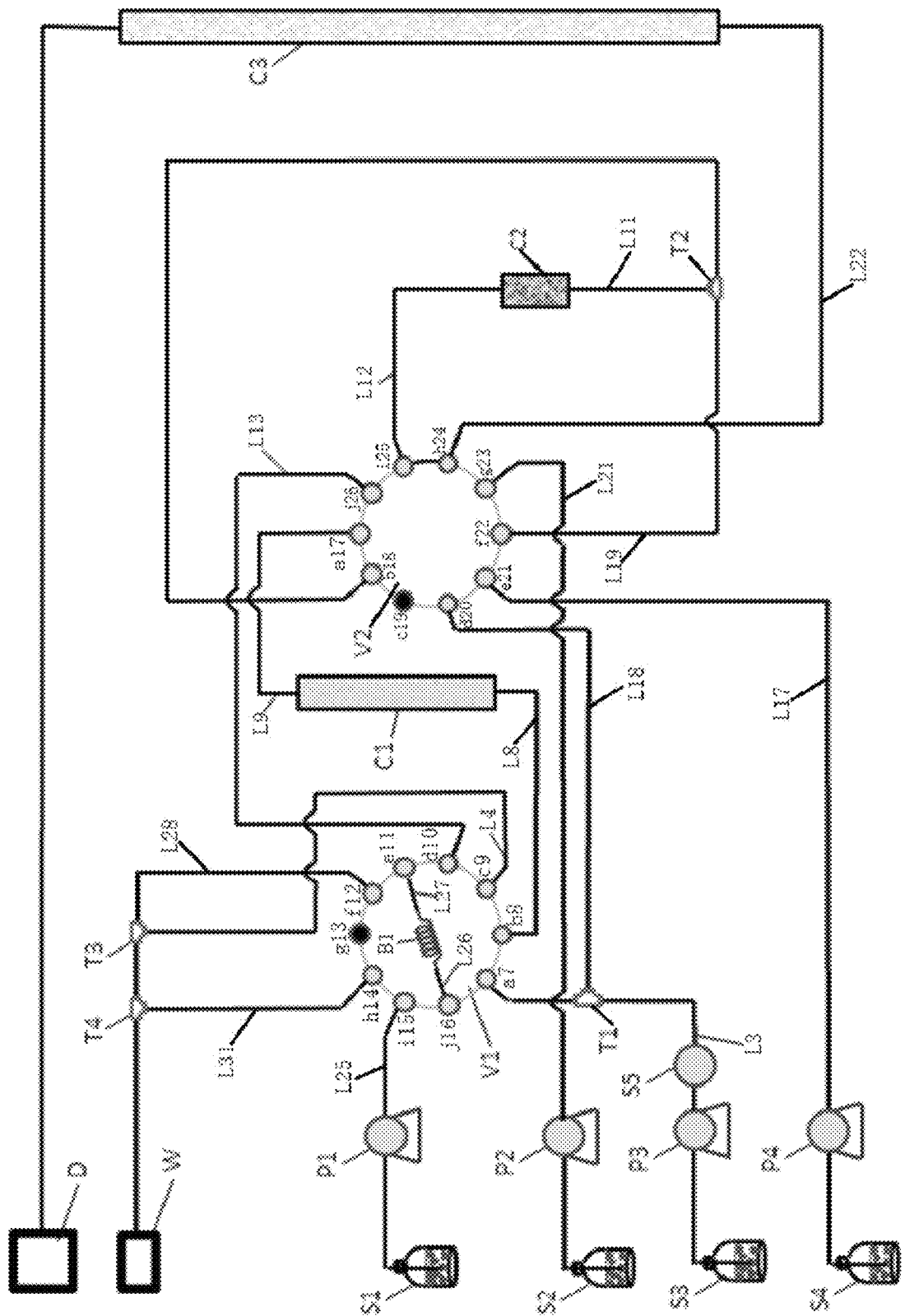
FIG. 8 is a structural schematic diagram of a liquid chromatography in embodiment 2.

As shown in FIG. 8, a liquid chromatography, on the basis of the liquid chromatography in embodiment 1, further comprises:

a modulation flow channel I L17, which conveys modulation solution S4; the modulation flow channel I L17 is connected with the port e21 of the multi-flow channel switch valve V2; and a modulation flow channel II L18, wherein one end of the modulation flow channel II L18 is connected with the port d20 of the multi-flow channel switch valve V2, and the other end of the modulation flow channel II L18 is connected with the first flow channel L3 and is connected with the flow channel located behind the sample injector S5.

Figure 9:
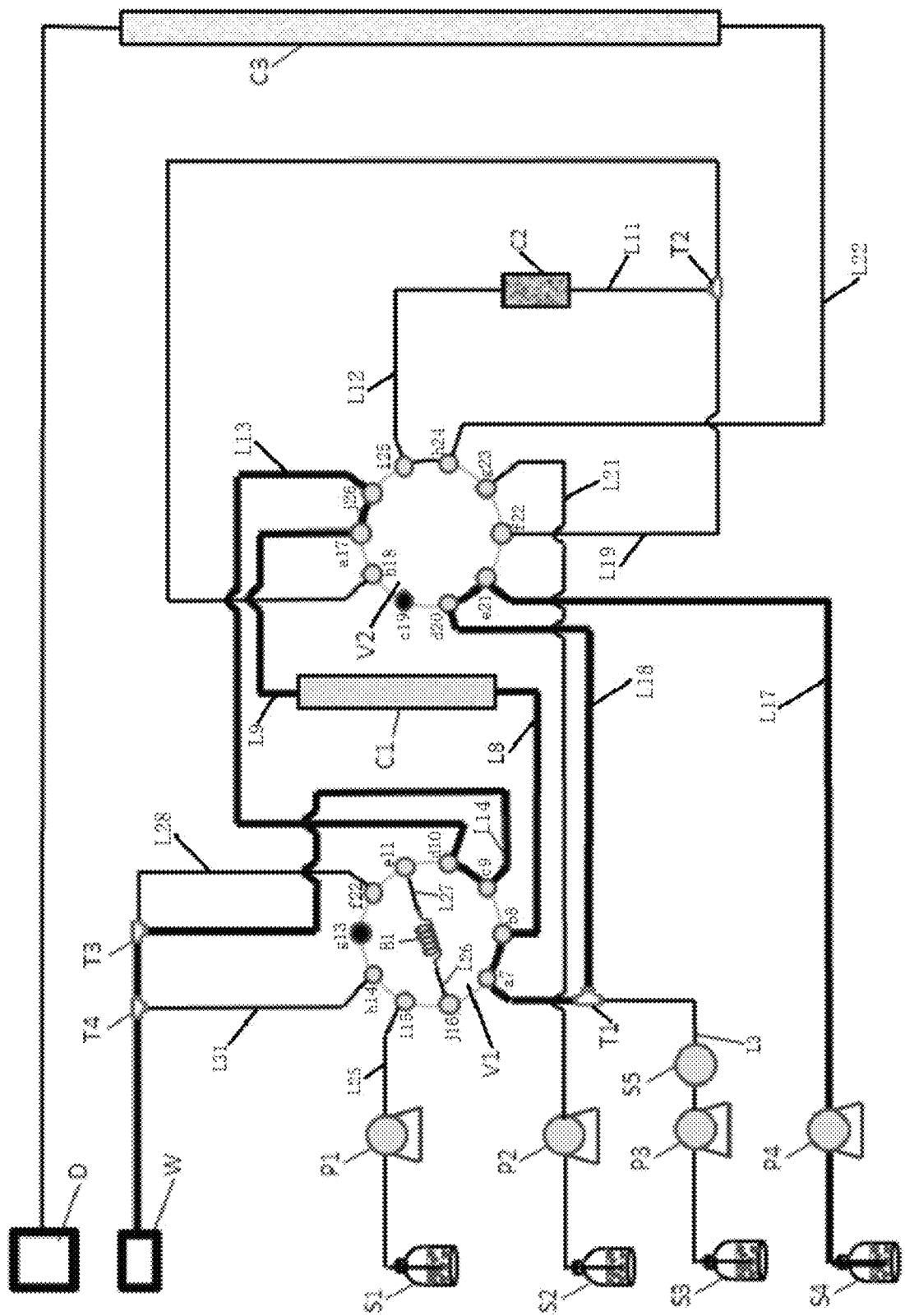
FIG. 9 is a working state diagram of the liquid chromatography in embodiment 2.

Function description: in addition to all functions in embodiment 1, the liquid chromatography in embodiment 2 further has the following special functions:

1. Function of Cleaning the First Chromatographic Column by Using the Modulation Solution:

As shown in FIG. 9, a conveying pump IVP4 is started to convey the modulation solution to the port e21 of the multi-flow channel switch valve V2, the port e21 and the port d20 are communicated to convey the modulation solution to the modulation flow channel II L18, then the modulation solution is conveyed to the interface a7 of the direction switch valve V1 by the first flow channel L13, the interface a7 and the interface b8 of the direction switch valve V1 are communicated, so that the modulation solution flows across the first chromatographic column C1, the impurities which is adaptive to the modulation solution and accumulated on the first chromatographic column C1 can be cleaned because the modulation solution can be different from the first mobile phase, the cleaned modulation solution flows across the port a17 of the multi-flow channel switch valve V2, the port a17 and the port j26 are communicated, so that the modulation solution flows to the middle communication pipeline L13, then the interface d10 of the direction switch valve V1 is communicated, and the interface d10 and the interface c9 are communicated, so that the modulation solution flows to the first waste liquid flow channel L14 to be discharged.

Figure 10:
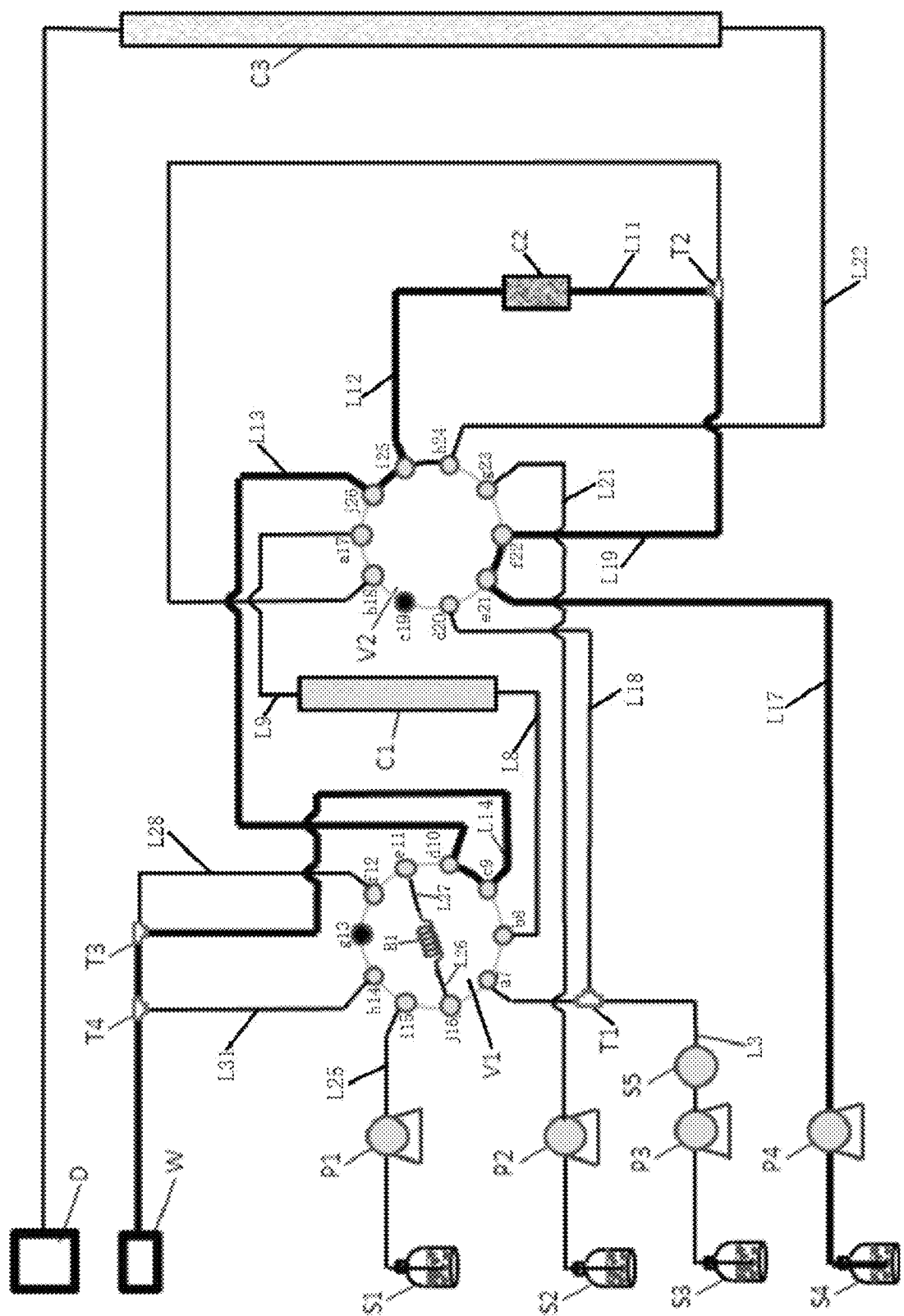
FIG. 10 is a working state diagram of the liquid chromatography in embodiment 2.

2. Function of Cleaning the Middle Chromatographic Column by Using the Modulation Solution:

As shown in FIG. 10, a conveying pump P4 is started to convey the modulation solution to the port e21 of the multi-flow channel switch valve V2, the port e21 and the port f22 are communicated to convey the modulation solution to the middle chromatographic column C2, the impurities which is adaptive to the modulation solution and accumulated on the middle chromatographic column C2 can be cleaned because the modulation solution can be different from the first mobile phase, then the modulation solution flows to the port i25 of the multi-flow channel switch valve V2, the port i25 and the port j26 are communicated, so that the modulation solution enters the interface d10 of the direction switch valve V1 through the middle communication pipeline L13, and the interface d10 and the interface c9 are communicated, so that the modulation solution flows to the first waste liquid flow channel L14 to be discharged.

Figure 11:
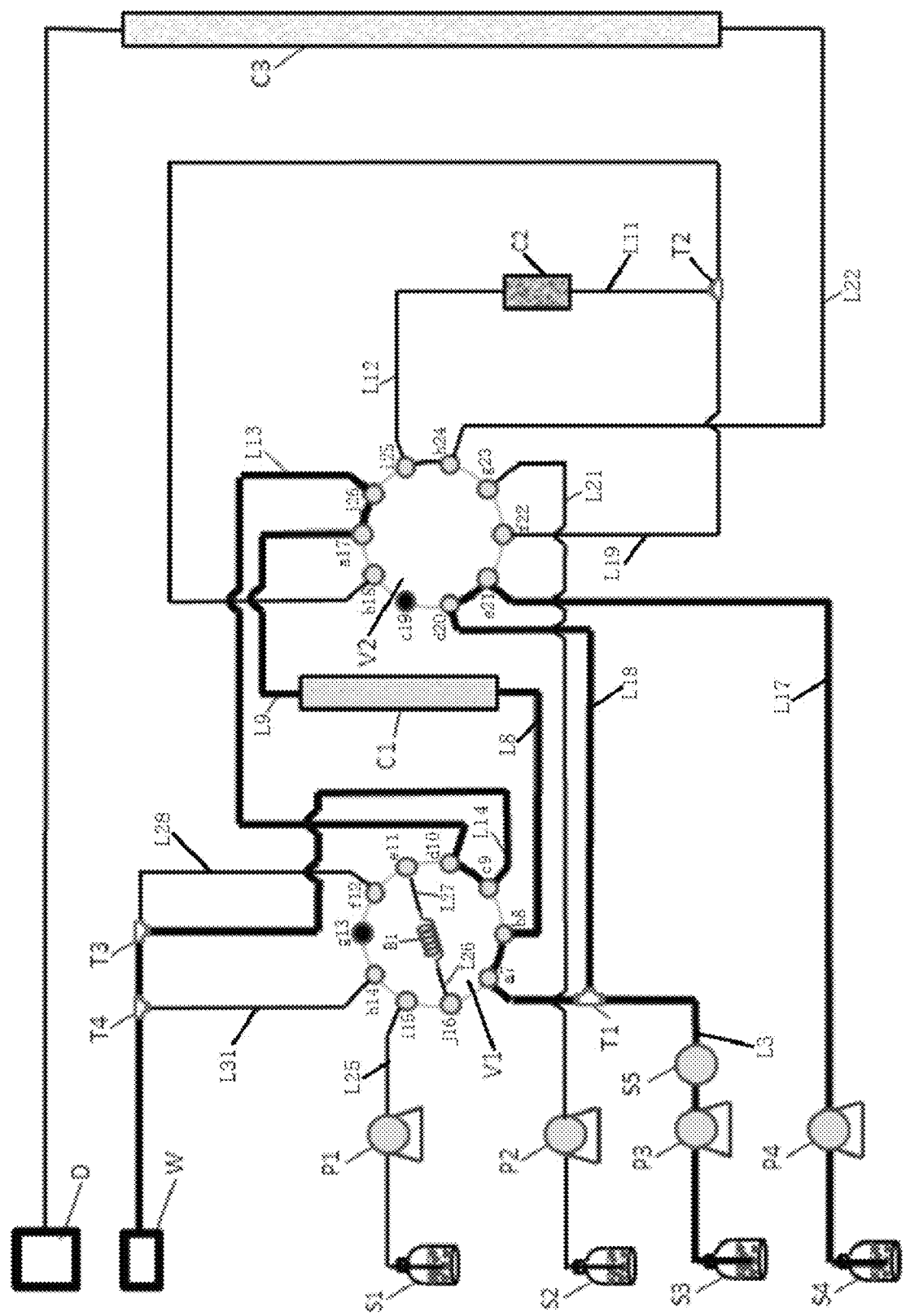
FIG. 11 is a working state diagram of the liquid chromatography in embodiment 2.

3. Function of Modulating the First Mobile Phase to Clean the First Chromatographic Column:

As shown in FIG. 11, the conveying pump III P3 is stared to convey the first mobile phase to the interface a7 of the direction switch valve V1, meanwhile the conveying pump P4 is started to convey the modulation solution to the port e21 of the multi-flow channel switch valve V2, the port e21 and the port d20 are communicated to convey the modulation solution to the modulation flow channel II L18, the first mobile phase and the modulation solution are mixed on the first flow channel L3, the modulation solution can be an acidic or alkaline solvent or a solvent containing special elution capacity, therefore the pH, the solvent proportion and the elution strength of the modulated first mobile phase are changed, the modulated mixed solution is conveyed to the interface a7 of the direction switch valve V1, the interface a7 and the interface b8 are communicated, so that the above-mentioned mixed solution flows across the first chromatographic column C1, accordingly, the impurities which is adaptive to the mixed solution and accumulated on the first chromatographic column C1 are cleaned, then the mixed solution flows across the port at 7 of the multi-flow channel switch valve V2, the port a17 and the port j26 are communicated, so that the mixed solution flows to the middle communication pipeline L13, and the interface d10 of the direction switch valve V1 is communicated, and the interface d10 and the interface c9 are communicated, so that the mixed solution flows to the first waste liquid flow channel L14 to be discharged.

Figure 12:
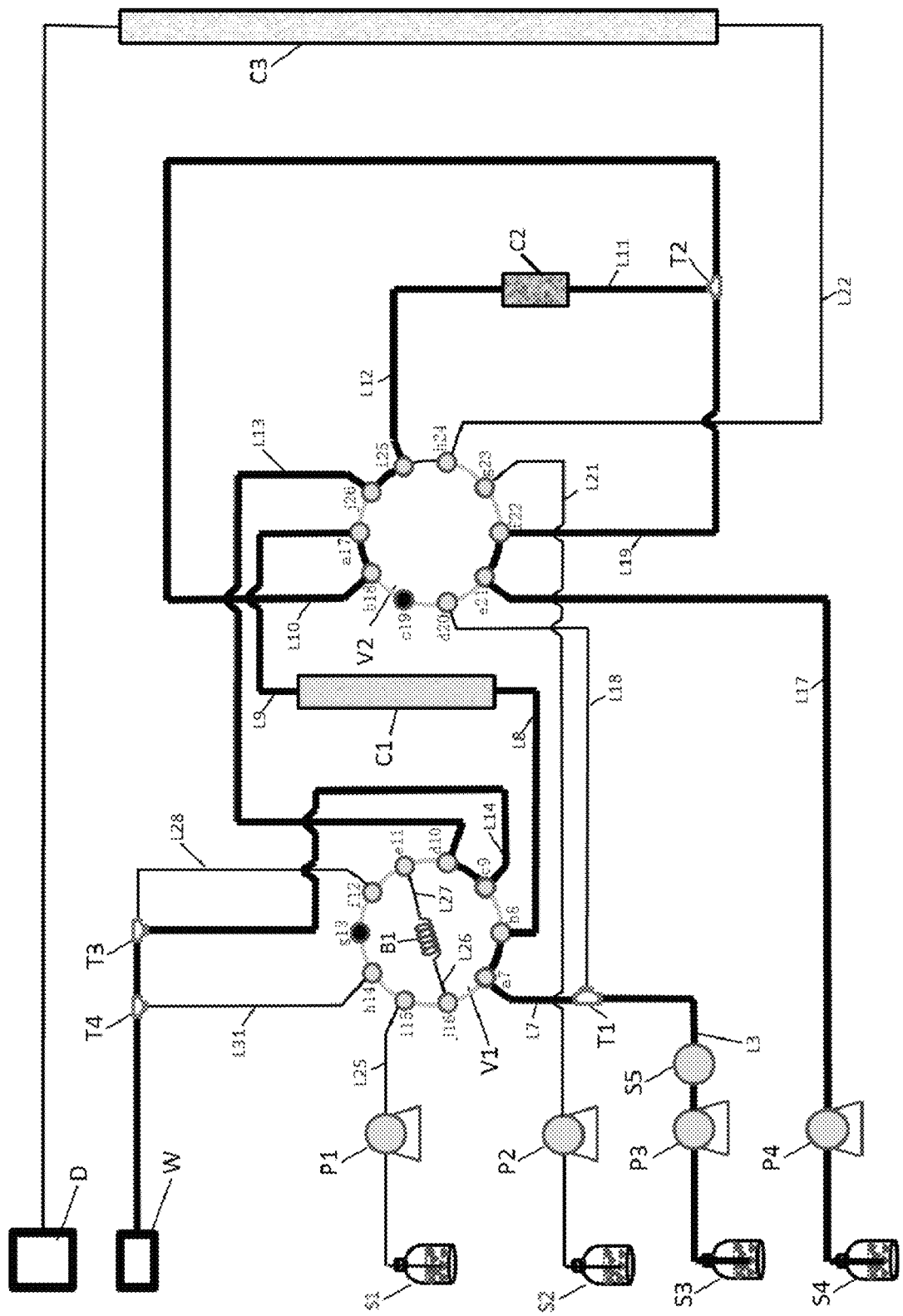
FIG. 12 is a working state diagram of the liquid chromatography in embodiment 2.

4. Function of Modulating the First Mobile Phase to Clean the Middle Chromatographic Column:

As shown in FIG. 12, the conveying pump III P3 is stared to convey the first mobile phase to the interface a7 of the direction switch valve V1, the interface a7 and the interface b8 of the direction switch valve V1 are communicated, so that the first mobile phase flows across the first chromatographic column C1 and then flows to the port a17 of the multi-flow channel switch valve V2, and the port a17 and the port b18 are communicated, and the first mobile phase flows to the tee joint T2 downstream; meanwhile, the conveying pump IV P4 is started to convey the modulation solution to the port e21 of the multi-flow channel switch valve V2, when the interface a7 and the interface b8 of the direction switch valve V1 are connected, the port e21 and the port 122 will be communicated, therefore the first mobile phase and the modulation solution are mixed on the tee joint T2 to form a mixed solution, accordingly the pH, the solvent proportion and the elution strength of the modulated first mobile phase are changed, the first mobile phase entering the middle chromatographic column is modulated, the above-mentioned mixed solution flows across the middle chromatographic column C2, and thus the impurities which is adaptive to the mixed solution and accumulated on the middle chromatographic column C2 are cleaned; and then the mixed solution flows across the port i25, the port i25 and the port j26 are communicated, so that the first mobile phase flows to the middle communication pipeline L13, and the interface d10 of the direction switch valve V1 is communicated, and the interface d10 and the interface c9 are communicated, so that the first mobile phase flows to the first waste liquid flow channel L14 to be discharged.

Embodiment 3

Figure 13:
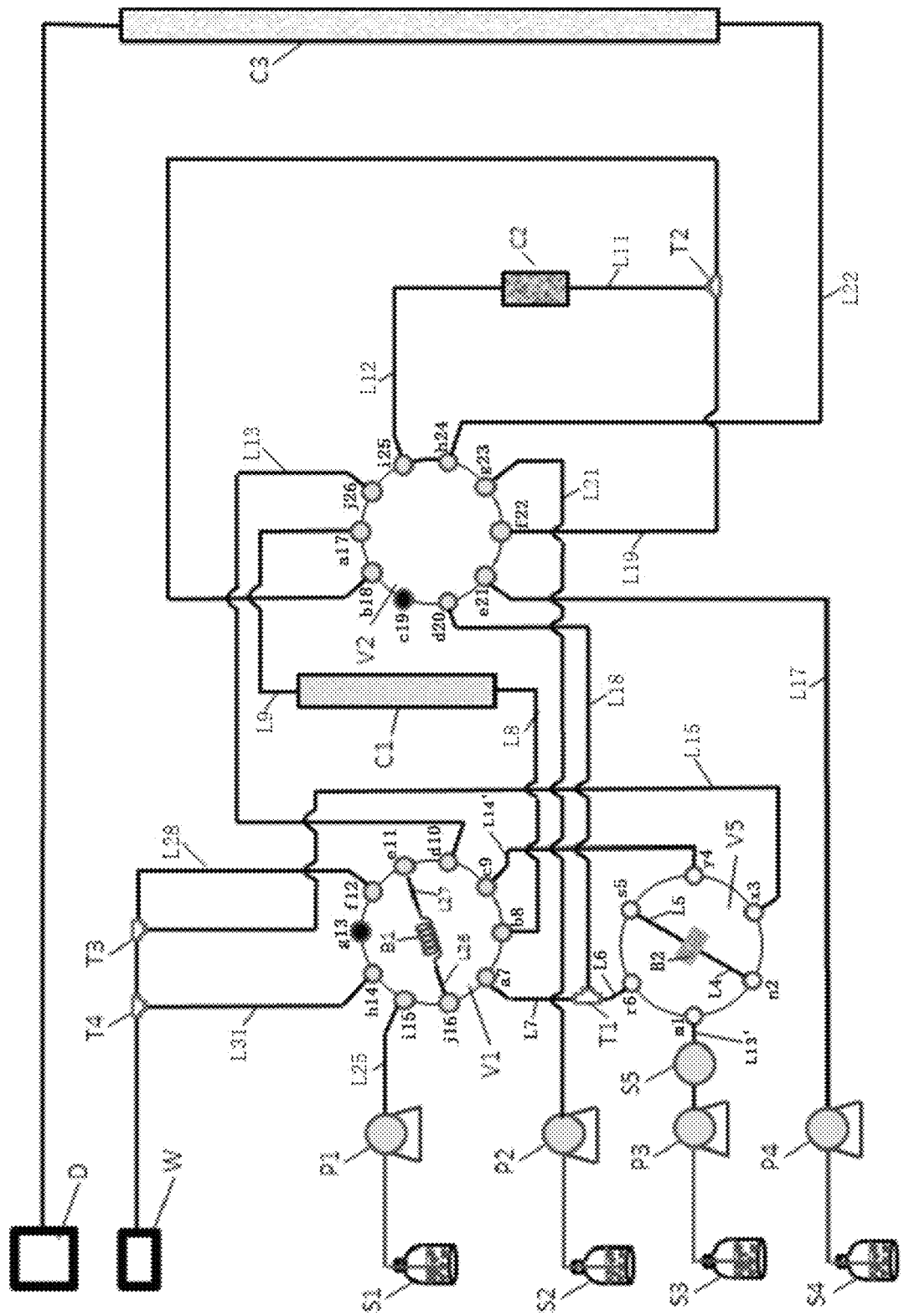
FIG. 13 is a structural schematic diagram of a liquid chromatography in embodiment 3.

As shown in FIG. 13, a liquid chromatography, on the basis of the liquid chromatography in embodiment 2, further comprises a rear switch valve V5, the rear switch valve V5 is provided with an interface m1, an interface n2, an interface x3, an interface y4, an interface s5 and interface r6; a filter or a protector B2 is connected between the interface n2 and the interface s5; interface y4 is connected with one segment of the first waste liquid flow channel L14, and the interface x3 is connected with the other segment of the first waste liquid flow channel L14; and the interface m1 is connected with one segment of the first flow channel L3, and the interface r6 is connected with the other segment of the first flow channel L3.

Figure 14:
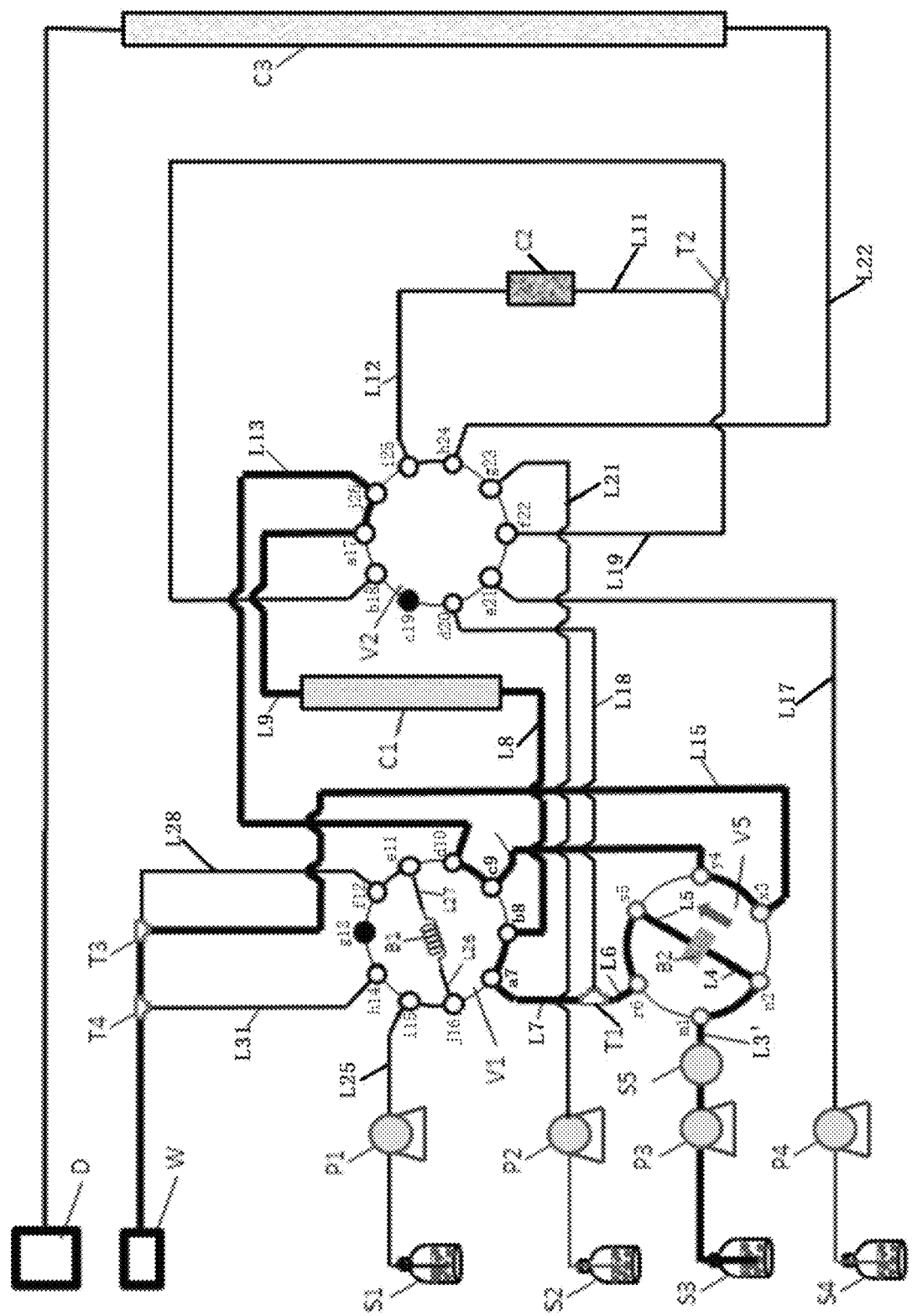
FIG. 14 is a working state diagram of the liquid chromatography in embodiment 3.

Function description: in addition to all functions in embodiment 1 and embodiment 2, the liquid chromatography in embodiment 3 further has the following special functions:

1. Function of Intercepting Insoluble Impurities Using the Filter or the Protector B2:

As shown in FIG. 14, the conveying pump III P3 is started to convey the first mobile phase to the interface m1 of the rear switch valve V5, the test sample enters the first flow channel L3 through the sample injector S5, the interface m1 and the interface n2 are communicated, so that the first mobile phase containing the test sample firstly flows across the filter or the protector B2, therefore the insoluble impurities contained in the test sample or the first mobile phase are intercepted by the filter or the protector B2 and cannot enter the downstream pipelines, the interface s5 and the interface r6 are communicated, so that the filtered first mobile phase and the test sample are conveyed to the interface a7 of the direction switch valve V1, the interface a7 and the interface b8 of the direction switch valve V1 are communicated, so that the first mobile phase flows across the first chromatographic column C1 and then flows to the port a17 of the multi-flow channel switch valve V2, and the port a17 and the port j26 are communicated, so that the first mobile phase flows to the middle communication pipeline L13 and then flows to the interface d10 of the direction switch valve V1, the interface d10 and the interface c9 are communicated, so that the first mobile phase flows to one segment L14' of the first waste liquid flow channel, and the interface y4 and the interface x3 of the rear switch valve V5 are connected, so that the first mobile phase is discharged from the other segment L15 of the first waste liquid flow channel.

Figure 15:
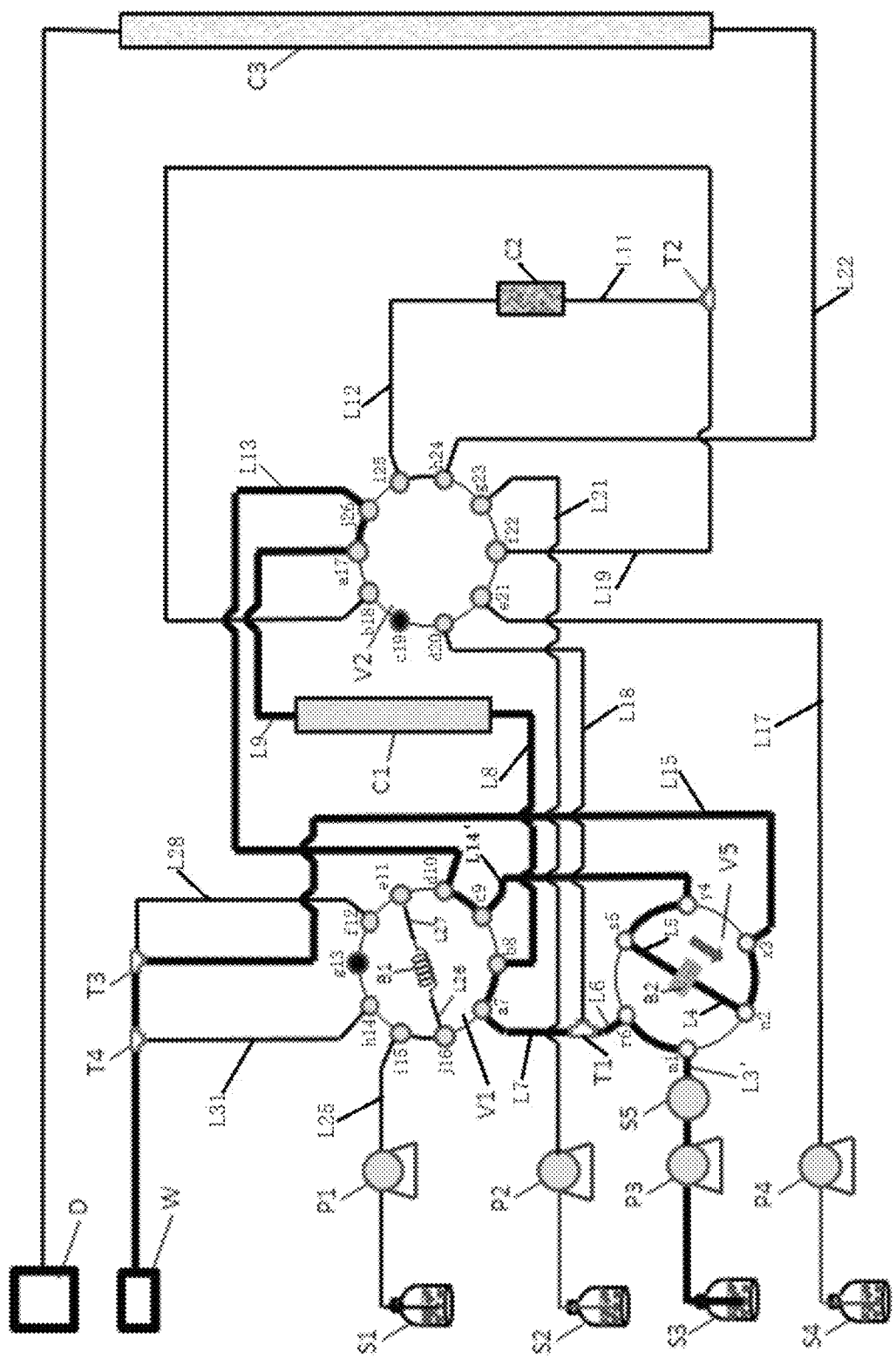
FIG. 15 is a working state diagram of the liquid chromatography in embodiment 3.

2. Cleaning Function of the Filter or the Protector:

As shown in FIG. 15, after the above-mentioned interception function is implemented for a period of time, when the target component in the test sample goes though the filter or the protector B2, or when the liquid chromatography is not used for analysis of the test sample, the communication direction of the rear switch valve V5 can be changed, the interface m1 and the interface r6 are communicated, the interface y4 and the interface s5 are communicated, and the interface m2 and the interface x3 are communicated, such that the filter or the protector is converted to the rear of the flow direction of the first chromatographic column by the rear switch valve, moreover, the flow direction of the solution in the filter or the protector is reverse to the direction in FIG. 14, accordingly the impurities intercepted on the filter or the protector can be directly discharged to the waste liquid end, thus realizing function of cleaning the impurities brought in the test sample or the first mobile phase online, which is specifically as follows:

the first mobile phase is conveyed to the interface m1 of the rear switch valve V5, the interface m1 and the interface r6 are communicated, so that the first mobile phase is conveyed to the interface a7 of the direction switch valve V1, the interface a7 and the interface b8 of the direction switch valve V1 are communicated, so that the first mobile phase flows across the first chromatographic column C1 and then flows to the port a17 of the multi-flow channel switch valve V2, and the port a17 and the port j26 are communicated, so that the first mobile phase flows to the middle communication pipeline L13, then the interface d10 of the direction switch valve V1 is communicated, and the interface d10 and the interface c9 are communicated, so that the first mobile phase flows to one segment L14' of the first waste liquid flow channel, and the interface v4 and the interface s5 of the rear switch valve V5 are connected, so that the first mobile phase reversely flows across the filter or the protector B2 to clean the insoluble impurities intercepted on the filter or the protector B2, then the first mobile phase flows to the other segment L15 of the first waste liquid flow channel from the interface n2 and the interface x3 to be discharged, and thus the on-line cleaning function for the impurities is realized.

Embodiment 4

A liquid chromatography comprises:
a first flow channel L3 connected with a sample injector S5, which conveys a first mobile phase S3;
a second flow channel L21, which conveys a second mobile phase S2;
a first pipeline L8 and a second pipeline L9, which respectively connect with one end and the other end of a first chromatographic column C1; the first chromatographic column C1, which performs primary separation on a sample;
a third pipeline L12 and a fourth pipeline L11, which respectively connect with one end and the other end of a middle chromatographic column C2; the middle chromatographic column C2, which captures substances separated out by the first chromatographic column C1;
an analysis flow channel L22, comprising a second chromatographic column C3 and a detector D connected in sequence which further separate and detect the substances captured in the middle chromatographic column C2;
a fourth waste liquid flow channels L32, which discharges waste liquid;
the liquid chromatography further comprises a multi-flow channel switch valve V2 provided with a plurality of ports, a connection pipeline L19 is connected between any two ports of the multi-flow channel switch valve V2, and the third pipeline L12 and the fourth pipeline L11 which respectively connect with one end and the other end of the middle chromatographic column C2 are arranged between the connection pipeline L19 and another one of the rest ports; the first flow channel L3 communicates with the first pipeline L8 and the second pipeline L9 which respectively connect with one end and the other end of the first chromatographic column C1 and is connected with one of the ports of the multi-flow channel switch valve V2; the second flow channel L21, the analysis flow channel L22 and the fourth waste liquid flow channel L32 are separately connected with any one of the rest ports of the multi-flow channel switch valve V2;
the liquid chromatography further comprises a modulation flow channel L17 which conveys modulation solution S4; the modulation flow channel I L17 is connected with any one of the rest ports of the multi-flow channel switch valve V2; and
the liquid chromatography further comprises a modulation flow channel II L18, wherein one end of the modulation flow channel II L18 is connected with any one of the rest ports of the multi-flow channel switch valve V2, and the other end of the modulation flow channel II L18 is connected with the first flow channel L3 and is connected with the flow channel located behind the sample injector S5, or the other end of the modulation flow channel II L18 is connected with the first pipeline L8 which connects with the one end of the first chromatographic column C1.

Figure 16:
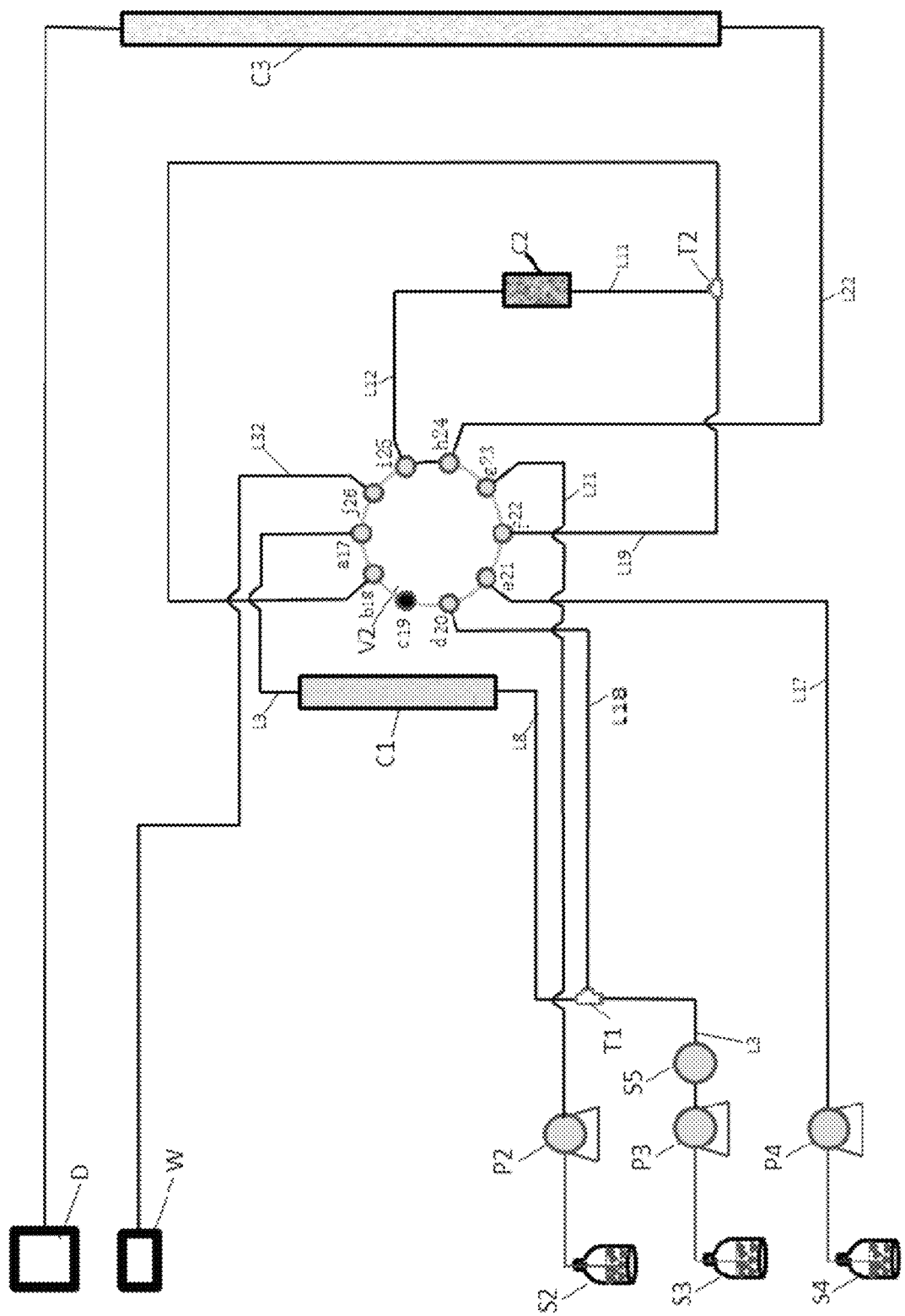
FIG. 16 is a structural schematic diagram of a liquid chromatography in embodiment 4.

As shown in FIG. 16, a preferred connection mode is as follows:
the multi-flow channel switch valve comprises a port a17, a port b18, a port c19, a port d20, a port e21, a port f22, a port g23, a port h24, a port i25 and a port j26, the port c19 is in a plugged state, the port a17 is connected with the second pipeline L9 which connects with the other end of the first chromatographic column C1, the port b18 is connected with the port f22 through the connection pipeline L19, the port i25 is connected with the third pipeline L12 which connects with the one end of the middle chromatographic column C2, the fourth pipeline L11 which connects with the other end of the middle chromatographic column C2 is connected with the connection pipeline L19 through a tee joint bT2, the port g23 is connected with the second flow channel L21, and the port h24 is connected with the analysis flow channel L22; the modulation flow channel I L17 is connected with the port e21 of the multi-flow channel switch valve V2; and one end of the modulation flow channel II L18 is connected with the port d20 of the multi-flow channel switch valve V2, and the other end of the modulation flow channel II L18 is connected with the first flow channel L3 through a tee joint aT1 and is connected with the flow channel located behind the sample injector S5. The fourth waste liquid flow channel L32 is connected with the port j26 of the multi-flow channel switch valve V2.

Regular Functions are Described as Follows:
1. Separation function of the first chromatographic column: the conveying pump III P3 is started, so that the first mobile phase flows across the first chromatographic column C1, the test sample is introduced by the sample injector S5, the components in the test sample start to be separated under the separation mechanism of the first mobile phase and the first chromatographic column, then the first mobile phase containing the separated components flows to the port a17 of the multi-flow channel switch valve V2, the port a17 and the port b26 of the multi-flow channel switch valve V2 are communicated, so that the first mobile phase flows to the fourth waste liquid flow channel L32 to be discharged.

2. Capturing function of the middle chromatographic column: the conveying pump III P3 is stared, so that the first mobile phase flows across the first chromatographic column C1, the test sample is introduced by the sample injector S5, the components in the test sample start to be separated under the separation mechanism of the first mobile phase and the first chromatographic column, then the first mobile phase containing the separated components flows to the port all of the multi-flow channel switch valve V2, the port a17 and the port b18 of the multi-flow channel switch valve V2 are communicated, so that the first mobile phase flows across the middle chromatographic column C2, the target component contained in the first mobile phase is captured by the middle chromatographic column C2 and cannot be taken away by the first mobile phase, the first mobile phase flows to the port i25, and the port i25 and the port j26 are communicated, so that the first mobile phase flows to the fourth waste liquid flow channel L32 to be discharged.

3. The separation function of the second chromatographic column: the conveying pump II P2 is started to convey the second mobile phase to the port g23 of the multi-flow channel switch valve V2, the port g23 and the port f22 are communicated, so that the second mobile phase flows across the middle chromatographic column C2, the above-mentioned target component is eluted by the second mobile phase and is contained in the second mobile phase to flow to the port i25, the port i25 and the port h24 are communicated, so that the second mobile phase flows across the analysis flow channel L22, finally the target component is further separated under the separation mechanism of the second mobile phase and the second chromatographic column C3, and the target component is detected by the detector D after flowing out from the second chromatographic column C3.

Specific Functions of the Present Invention are Described as Follows

Figure 17:
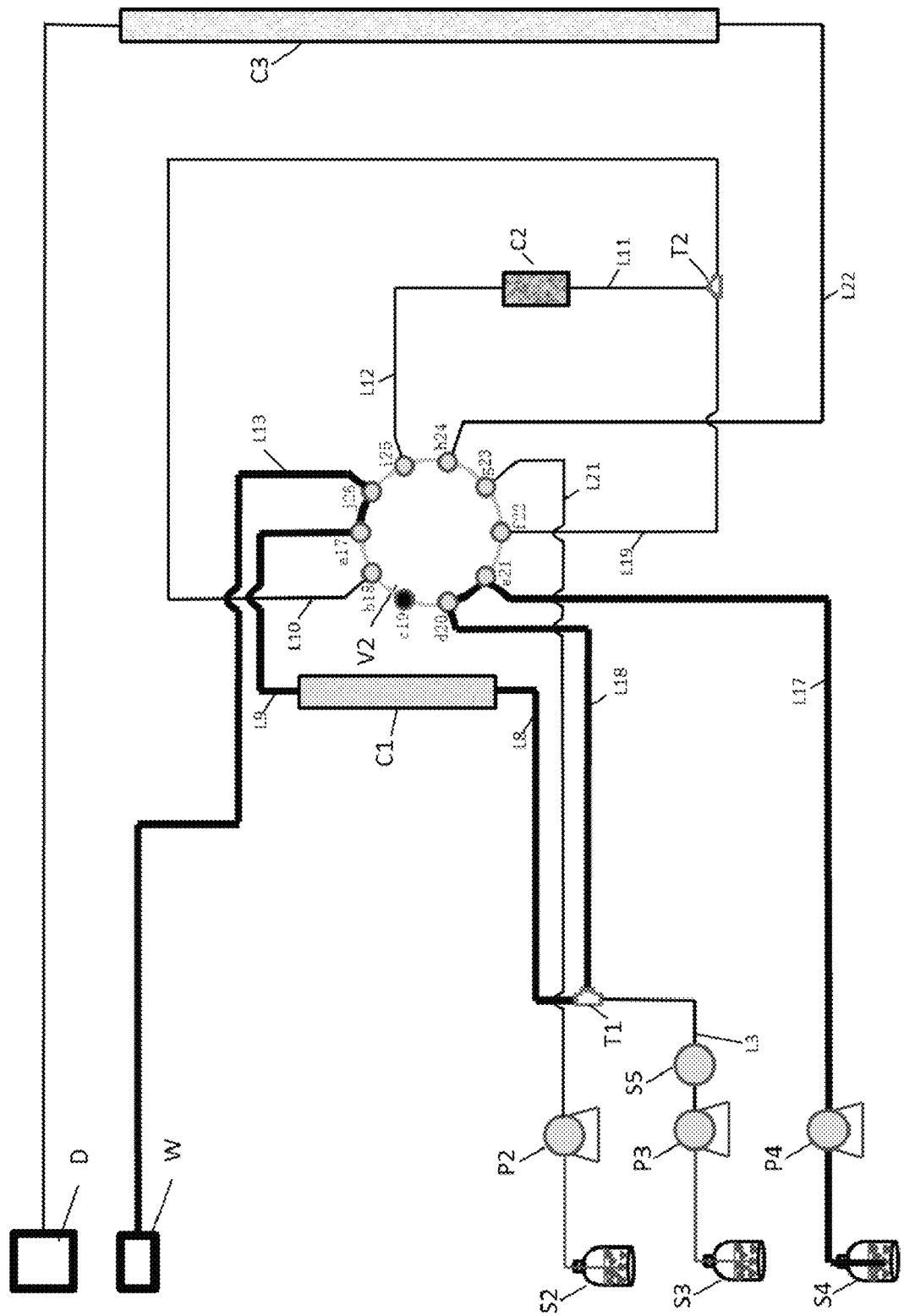
FIG. 17 is a working state diagram of the liquid chromatography in embodiment 4.

1. Function of Cleaning the First Chromatographic Column by Using the Modulation Solution:

As shown in FIG. 17, the conveying pump IV P4 is started to convey the modulation solution to the port e21 of the multi-flow channel switch valve V2, the port e21 and the port d20 are communicated to convey the modulation solution to the modulation flow channel II L18, the modulation solution flows across the first chromatographic column C1, the impurities which is adaptive to the modulation solution and accumulated on the first chromatographic column C1 can be cleaned because the modulation solution can be different from the first mobile phase, then the cleaned modulation solution flows across the port a17 of the multi-flow channel switch valve V2, and the port a17 and the port j26 are communicated, so that the modulation solution flows to the fourth waste liquid flow channel L32 to be discharged.

Figure 18:
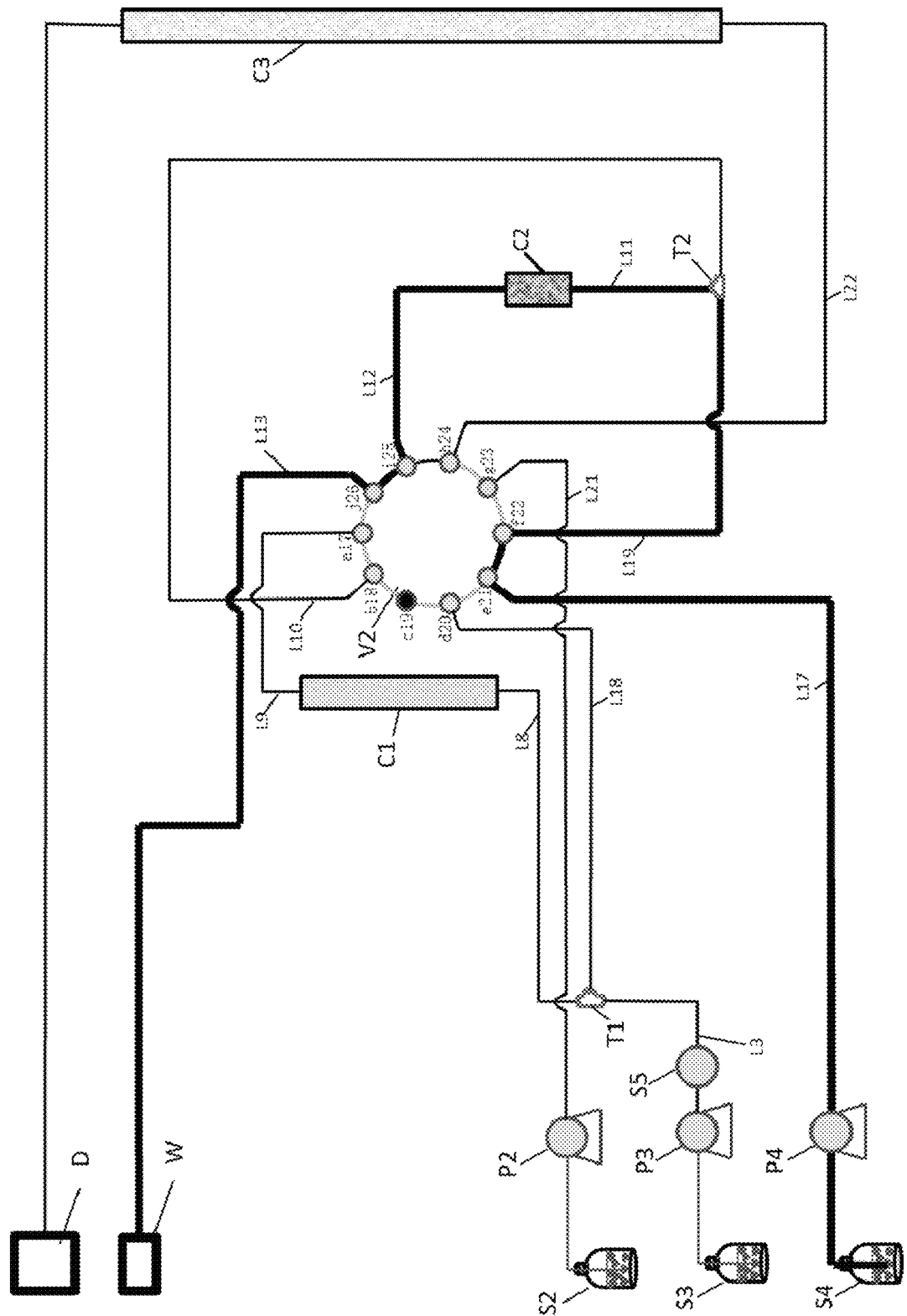
FIG. 18 is a working state diagram of the liquid chromatography in embodiment 4.

2. Function of Cleaning the Middle Chromatographic Column by Using the Modulation Solution:

As shown in FIG. 18, the conveying pump P4 is started to convey the modulation solution to the port e21 of the multi-flow channel switch valve V2, the port e21 and the port f22 are communicated to convey the modulation solution to the middle chromatographic column C2, the impurities which is adaptive to the modulation solution and accumulated on the middle chromatographic column C2 can be cleaned because the modulation solution can be different from the first mobile phase, then the modulation solution flows to the port i25 of the multi-flow channel switch valve V2, and the port i25 and the port j26 are communicated, so that the modulation solution flows to the fourth waste liquid flow channel L32 to be discharged.

Figure 19:
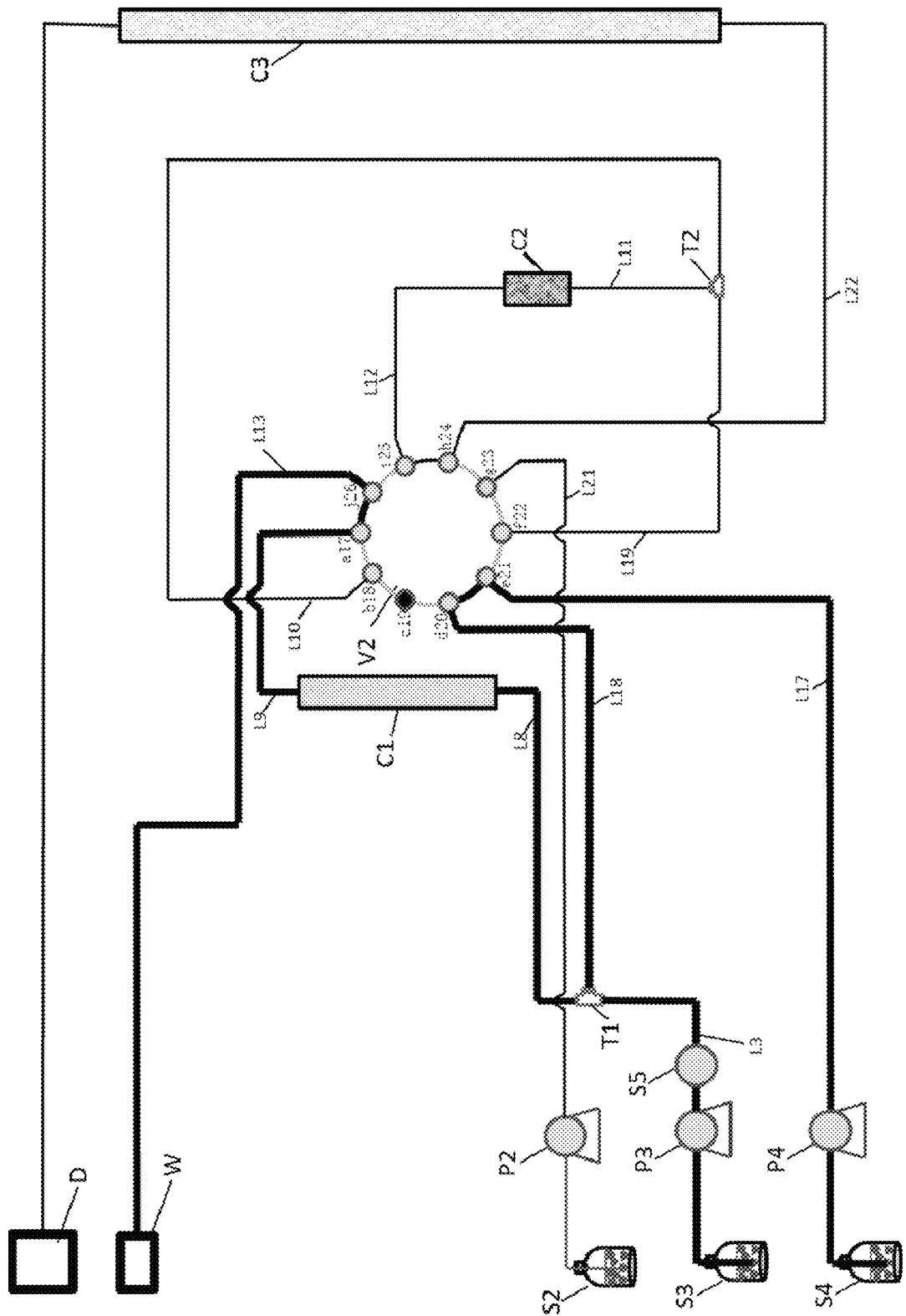
FIG. 19 is a working state diagram of the liquid chromatography in embodiment 4.

3. Function of Modulating the First Mobile Phase to Clean the First Chromatographic Column:

As shown in FIG. 19, the conveying pump III P3 is started, meanwhile the conveying pump P4 is started to convey the modulation solution to the port e21 of the multi-flow channel switch valve V2, the port e21 and the port d20 are communicated to convey the modulation solution to the modulation flow channel II L18, the first mobile phase and the modulation solution are mixed on the first flow channel L3, the modulation solution can be an acidic or alkaline solvent or a solvent containing special elution capacity, therefore the pH, the solvent proportion and the elution strength of the modulated first mobile phase are changed, the modulated mixed solution flows across the first chromatographic column C1, accordingly, the impurities which is adaptive to the mixed solution and accumulated on the first chromatographic column C1 are cleaned, then the mixed solution flows across the port a17 of the multi-flow channel switch valve V2, and the port a17 and the port j26 are communicated, so that the mixed solution flows to the fourth waste liquid flow channel L32 to be discharged.

Figure 20:
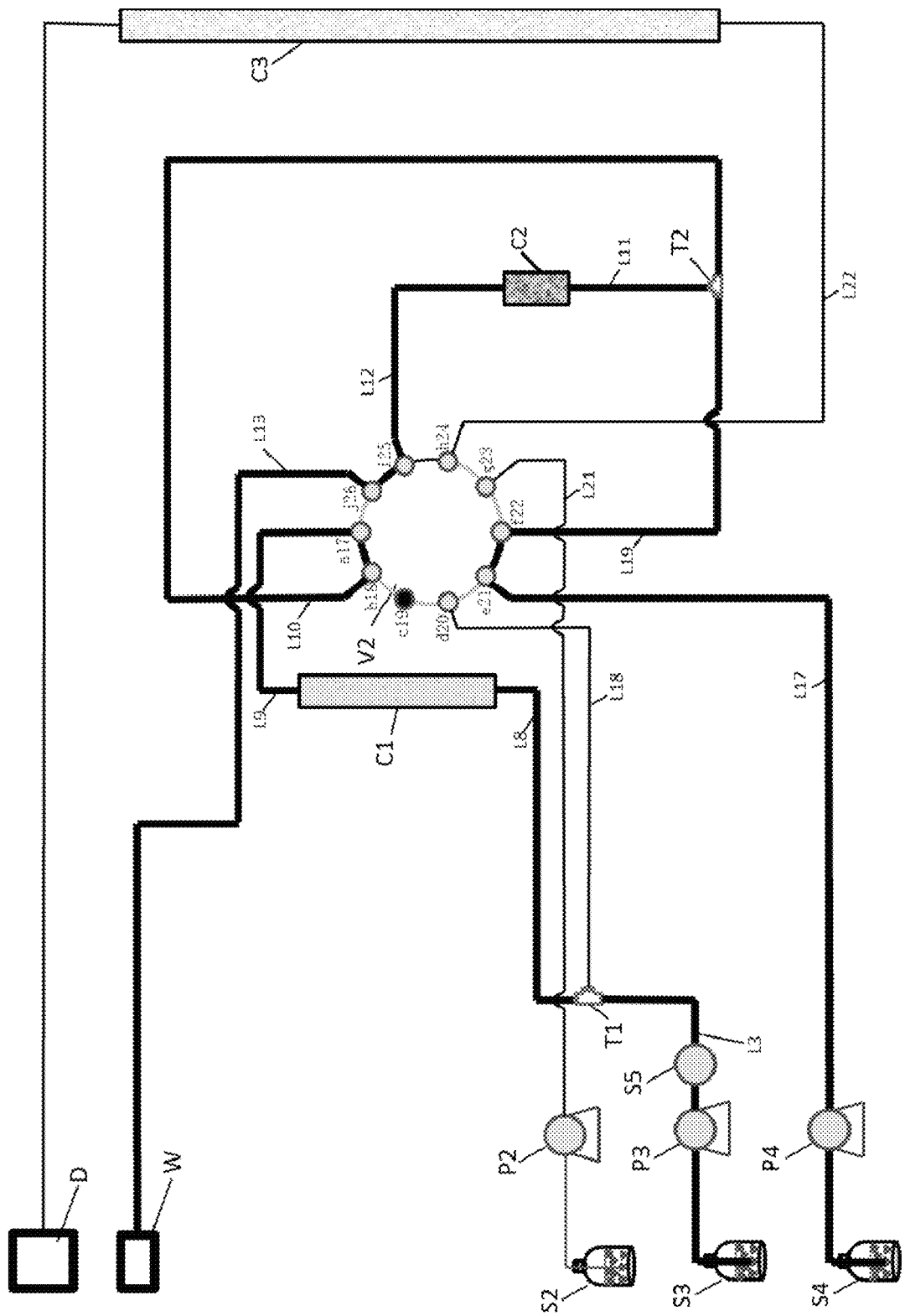
FIG. 20 is a working state diagram of the liquid chromatography in embodiment 4.

4. Function of Modulating the First Mobile Phase to Clean the Middle Chromatographic Column:

As shown in FIG. 20, the conveying pump III P3 is stared, so that the first mobile phase flows across the first chromatographic column C1 and then flows to the port a17 of the multi-flow channel switch valve V2, and the port all and the port h18 are communicated, so that the first mobile phase flows to the tee joint T2 downstream; meanwhile, the conveying pump IV P4 is started to convey the modulation solution to the port e21 of the multi-flow channel switch valve V2, the port e21 and the port f22 are communicated, therefore the first mobile phase and the modulation solution are mixed on the tee joint T2 to form a mixed solution, accordingly, the pH, the solvent proportion and the elution strength of the modulated first mobile phase are changed, the first mobile phase entering the middle chromatographic column is modulated, the above-mentioned mixed solution flows across the middle chromatographic column C2, and thus the impurities which is adaptive to the mixed solution and accumulated on the middle chromatographic column C2 are cleaned; and then the mixed solution flows across the port i25, and the port i25 and the port j26 are communicated, so that the first mobile phase flows to the fourth waste liquid flow channel L32 to be discharged.

Embodiment 5

A liquid chromatography comprises:

a first flow channel L3 connected with a sample injector S5, which conveys a first mobile phase S3;

a second flow channel L21, which conveys a second mobile phase S2;

an analysis flow channel L22, which separates and detects captured substances;

a fifth waste liquid flow channel L33, which discharges waste liquid;

a first pipeline L8 and a second pipeline L9, which respectively connect with one end and the other end of a first chromatographic column C1; a third L12 and a fourth pipeline L11, which connect with one end and the other end of a middle chromatographic column C2;

the liquid chromatography further comprises a rear switch valve V5 and a multi-flow channel switch valve V2, and a communication pipeline L34 which communicates the rear switch valve V5 with the multi-flow channel switch valve V2;

the rear switch valve V5 is provided with a plurality of interfaces, and any two adjacent interfaces of the rear switch valve V5 are communicated with the first flow channel L3 and the first pipeline L8, the first pipeline L8 is connected with the one end of the first chromatographic column C1; any other two adjacent interfaces of the rest interfaces are communicated with the fifth waste liquid flow channel L33 and one end of the communication pipeline L34; a filter or a protector B2 is connected between any other two rest interfaces of the rear switch valve V5; and the multi-flow channel switch valve V2 is provided with a plurality of ports, a connection pipeline L19 is connected between any two ports of the multi-flow channel switch valve V2, and the third pipeline L12 and the fourth pipeline L11 which respectively connect with one end and the other end of the middle chromatographic column C2 are arranged between the connection pipeline L19 and another one of the rest ports; the second flow channel L21, the analysis flow channel L22, the other end of the communication pipeline L34 and the second pipeline L9 are separately connected with any one of the rest ports of the multi-flow channel switch valve V2, the second pipeline L9 is connected with the other end of the first chromatographic column C1.

Figure 21:
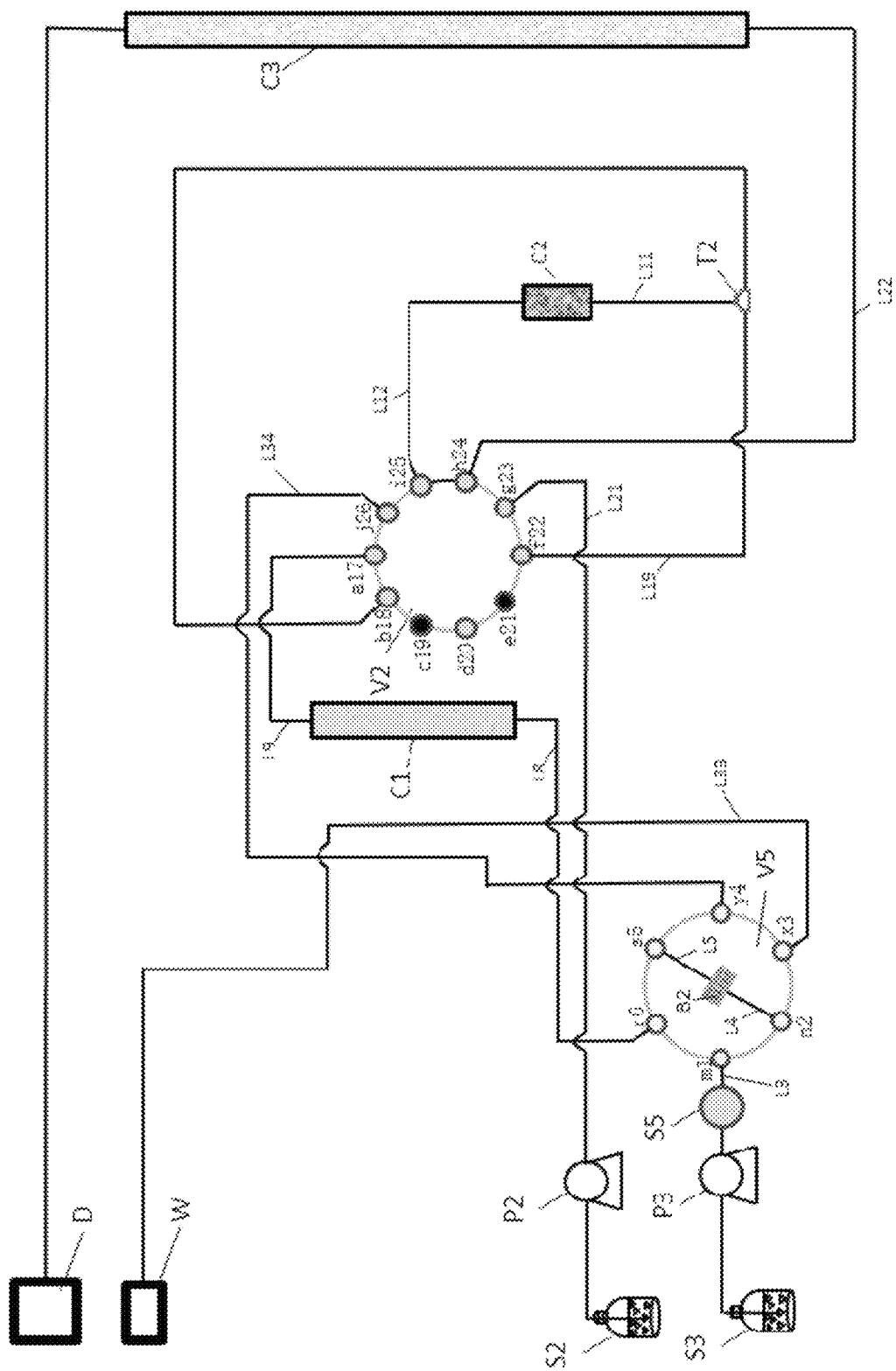
FIG. 21 is a structural schematic diagram of a liquid chromatography in embodiment 5.

As shown in FIG. 21, a preferred connection mode is as follows:

the rear switch valve V5 is provided with an interface m1, an interface n2, an interface x3, an interface y4, an interface s5 and an interface r6; the filter or the protector B2 is connected between the interface n2 and the interface s5; the interface m1 is connected with the first flow channel L3, the interface r6 is connected with the first pipeline L8 which connects with the one end of the first chromatographic column C1, the filter or the protector B2 is connected between the interface n2 and the interface s5, the interface x3 is connected with the fifth waste liquid flow channel l33, and the interface y4 is connected with one end of the communication pipeline L34.

The multi-flow channel switch valve is provided with a port a17, a port b18, a port c19, a port d20, a port e21, a port f22, a port g23, a port h24, a port i25 and a port j26, the port c19 and the port e21 are in a plugged state, the port a17 is connected with the second pipeline L9 which connects with the other end of the first chromatographic column C1, the port b18 is connected with the port f22 through the connection pipeline L19, the port i25 is connected with the third pipeline L12 which connects with the one end of the middle chromatographic column C2, the fourth pipeline L11 which connects with the other end of the middle chromatographic column C2 is connected with the connection pipeline L19 through a tee joint bT2, the port g23 is connected with the second flow channel L21, the port h24 is connected with the analysis flow channel L22, and the port j26 is connected with the other end of the communication pipeline L34.

Figure 22:
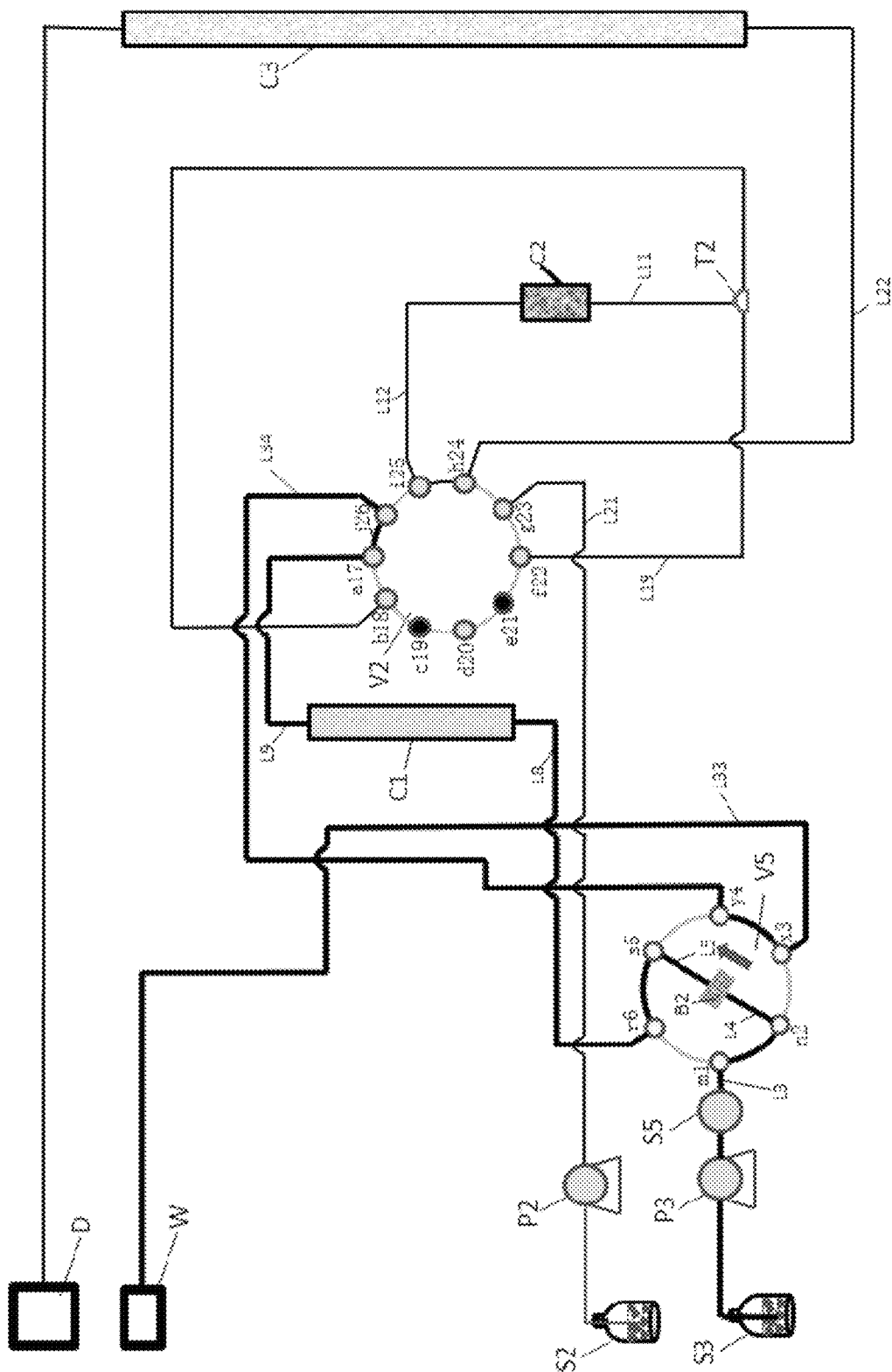
FIG. 22 is a working state diagram of the liquid chromatography in embodiment 5.
Figure 23:
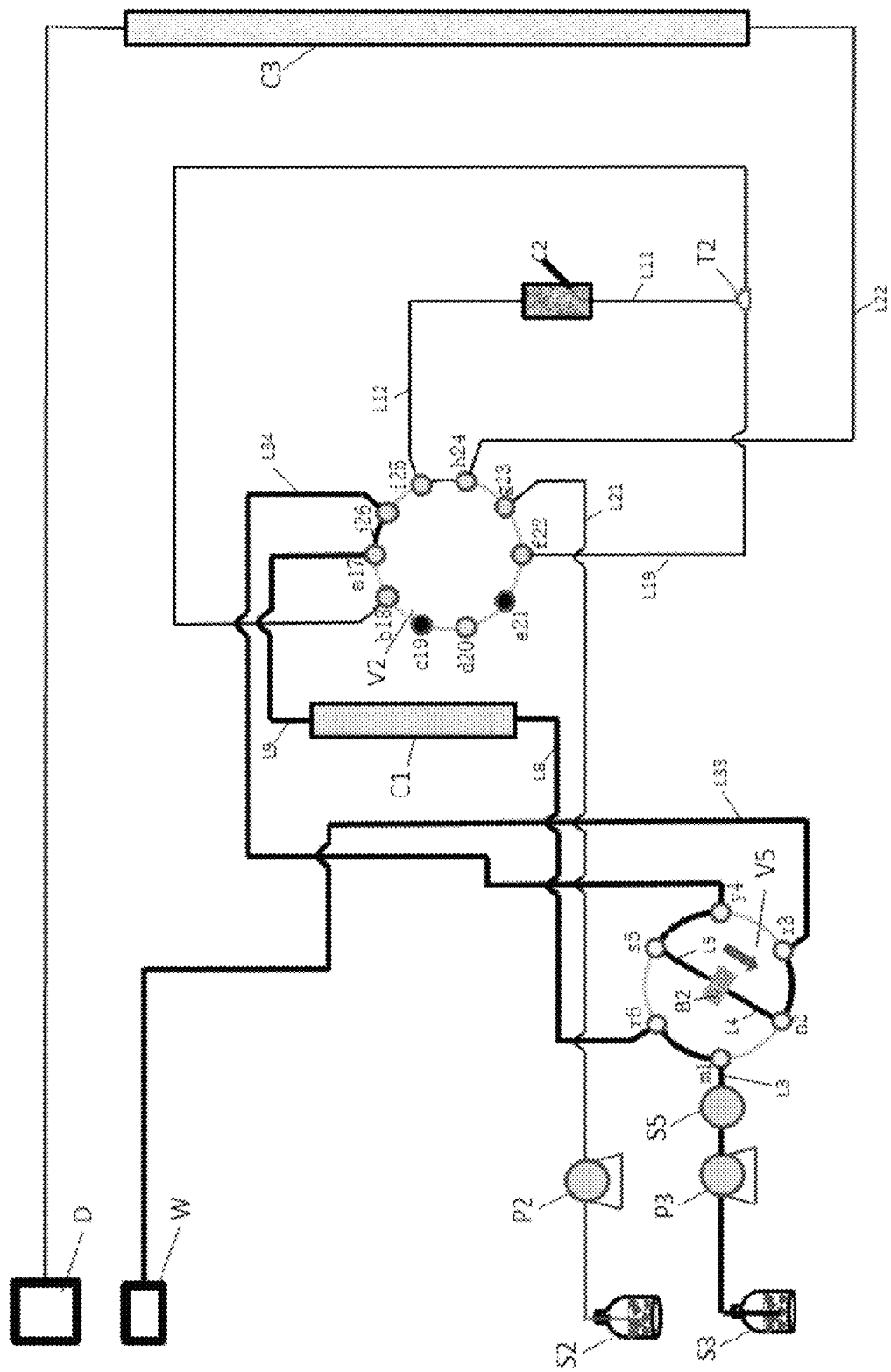
FIG. 23 is a working state diagram of the liquid chromatography in embodiment 5.

Function Description:

1: Function of Intercepting Insoluble Impurities by Using the Filter or the Protector B2:

As shown in FIG. 22, the conveying pump III P3 is started to convey the first mobile phase to the interface m1 of the rear switch valve V5, the test sample is introduced into the first flow channel L3 through the sample injector S5, the interface m1 and the interface n2 are communicated, so that the first mobile phase containing the test sample firstly flows across the filter or the protector 32, therefore the insoluble impurities contained in the test sample or the first mobile phase are intercepted by the filter or the protector B2 and cannot enter the downstream pipelines, the interface s5 and the interface r6 are communicated, so that the first mobile phase flows across the first chromatographic column C1 and then flows to the port a17 of the multi-flow channel switch valve V2, and the port a17 and the port j26 are communicated, so that the first mobile phase flows to the communication pipeline L34, and the interface y4 and the interface x3 of the rear switch valve V5 are connected, so that the first mobile phase is discharged from the fifth waste liquid flow channel L33.

2. Cleaning Function of the Filter or the Protector:

As shown in FIG. 3, after the above-mentioned interception function is implemented for a period of time, when the target component in the test sample passes by the filter or the protector 32, or when the liquid chromatography is not used for analysis of the test sample, the communication direction of the rear switch valve V5 can be changed, and the interface m1 and the interface r6 are communicated, the interface y4 and the interface s5 are communicated, and the interface m2 and the interface x3 are communicated, such that the filter or the protector is converted to the rear of the flow direction of the first chromatographic column by the rear switch valve, the flow direction of the solution in the filter or the protector is reverse to the direction in FIG. 22, accordingly the impurities intercepted on the filter or the protector can be directly discharged to the waste liquid end, thus realizing function of cleaning the impurities brought in the test sample or the first mobile phase online, which is specifically as follows:

the first mobile phase is conveyed to the interface m1 of the rear switch valve V5, the interface m1 and the interface r6 are communicated, so that the first mobile phase flows across the first chromatographic column C1 and then flows to the port a17 of the multi-flow channel switch valve V2, and the port a17 and the port j26 are communicated, so that the first mobile phase flows to the communication pipeline L34, the interface v4 and the interface s5 of the rear switch valve V5 are connected, so that the first mobile phase reversely flows across the filter or the protector B2 to clean the insoluble impurities intercepted on the filter or the protector B2, then the first mobile phase flows to the waste liquid flow channel L34 from the interface n2 and the interface x3 to be discharged, and thus the on-line cleaning function for the impurities is realized.

The invention claimed is:

1. A liquid chromatography system, comprising:
a first flow channel (L3) connected with a sample injector (S5), which conveys a first mobile phase (S3);
a second flow channel (L21), which conveys a second mobile phase (S2);
an analysis flow channel (L22), which separates and detects captured substances;
waste liquid flow channels, comprising a first waste liquid flow channel (L14) and a second waste liquid flow channel (L28), which discharges waste liquid;
a first pipeline (L8) and a second pipeline (L9), respectively connected with one end and the other end of a first chromatographic column (C1); a third pipeline (L12) and a fourth pipeline (L11), respectively connected with one end and the other end of a middle chromatographic column (C2);
wherein the liquid chromatography system further comprises a cleaning flow channel (L25), which conveys a cleaning solution (S1);
the liquid chromatography system further comprises a direction switch valve (V1) and a multi-flow channel switch valve (V2); the first pipeline (L8) and the second pipeline (L9) which respectively connect with one end and the other end of the first chromatographic column (C1) are arranged between the direction switch valve (V1) and the multi-flow channel switch valve (V2); a middle communication pipeline (L13) is arranged between the direction switch valve (V1) and the multi-flow channel switch valve (V2), which directly communicates the direction switch valve (V1) with the multi-flow channel switch valve (V2);
the direction switch valve (V1) comprises a plurality of interfaces, the first flow channel (L3), the cleaning flow channel (L25), the first waste liquid flow channel (L14), and the second waste liquid flow channel (L28) are each connected with a different interface of the direction switch valve (V1), and a cleaning solution storage ring (B1) is arranged between any other two rest interfaces, wherein the cleaning solution storage ring (B1) includes a coil capable of storing a higher volume of cleaning solution than a straight pipeline; and
the multi-flow channel switch valve (V2) comprises a plurality of ports, a connection pipeline (L19) is connected between two ports of the multi-flow channel switch valve (V2), and the third pipeline (L12) and the fourth pipeline (L11) which respectively connect with one end and the other end of the middle chromatographic column (C2) are arranged between the connection pipeline (L19) and another one of the rest ports; the second flow channel (L21) and the analysis flow channel (L22) are separately connected with any one of the rest ports of the multi-flow channel switch valve (V2).

2. The liquid chromatography system of claim 1, further comprising:
a first modulation flow channel (L17), which conveys modulation solution (S4); the first modulation flow channel (L17) is connected with any one of the rest ports of the multi-flow channel switch valve (V2); and
a second modulation flow channel (L18), wherein one end of the second modulation flow channel (L18) is connected with any one of the rest ports of the multi-flow channel switch valve (V2), and the other end of the second modulation flow channel (L18) is connected with the first flow channel (L3) and is connected with the flow channel located behind the sample injector (S5); or the other end of the second modulation flow channel (L18) is connected with the first pipeline (L8) which connects with the one end of the first chromatographic column (C1).

3. The liquid chromatography system of claim 2, further comprising a rear switch valve (V5), wherein the rear switch valve (V5) is provided with a plurality of interfaces, and any two adjacent interfaces of the rear switch valve (V5) are connected in the first flow channel (L3) and are located on the flow channel between the sample injector (S5) and the second modulation flow channel (L18); any other two adjacent interfaces of the rest interfaces are connected in the waste liquid flow channel (L14); and a filter or a protector (B2) is connected between any other two rest interfaces.

4. The liquid chromatography system of claim 1, wherein the direction switch valve (V1) comprises a first interface (a7), a second interface (b8), a third interface (c9), a fourth interface (d10), a fifth interface (e11), a sixth interface (f12), a seventh interface (g13), an eighth interface (h14), a ninth interface (i15) and a tenth interface (j16), the cleaning solution storage ring (B1) is connected between the fifth interface (e11) and the tenth interface (j16), the first interface (a7) is connected with the first flow channel (L3), the second interface (b8) is connected with the first pipeline (L8) which connects with the one end of the first chromatographic column (C1), the third interface (c9) and the sixth interface (f12) are separately connected with the waste liquid flow channels, the fourth interface (d10) is connected with the middle communication pipeline (L13), the seventh interface (g13) is in a plugged state, and the ninth interface (i15) is connected with the cleaning flow channel (L25).

5. The liquid chromatography system of claim 1, wherein the multi-flow channel switch valve (V2) is provided with a first port (a17), a second port (b18), a third port (c19), a fourth port (d20), a fifth port (e21), a sixth port (f22), a seventh port (g23), an eighth port (h24), a ninth port (i25) and a tenth port (j26), the third port (c19) is in a plugged state, the first port (a17) is connected with the second pipeline (L9) which connects with the other end of the first chromatographic column (C1), the second port (b18) is connected with the sixth port (f22) through the connection pipeline (L19), the ninth port (i25) is connected with the third pipeline (L12) which connects with the one end of the middle chromatographic column (C2), the fourth pipeline (L11) which connects with the other end of the middle chromatographic column (C2) is connected with the connection pipeline (L19) through a second tee joint (T2), the seventh port (g23) is connected with the second flow channel (L21), and the eighth port (h24) is connected with the analysis flow channel (L22).

6. The liquid chromatography system of claim 5, wherein the fifth port (e21) is in a plugged state.

7. The liquid chromatography system of claim 5, wherein the first modulation flow channel (L17) is connected with the fifth port (e21) of the multi-flow channel switch valve (V2); one end of the second modulation flow channel (L18) is connected with the fourth port (d20) of the multi-flow channel switch valve (V2), and the other end of the second modulation flow channel (L18) is connected with the first flow channel (L3) through a first tee joint (T1) and is connected with the flow channel located behind the sample injector (S5).

8. The liquid chromatography system of claim 7, wherein the rear switch valve (V5) is provided with a plurality of interfaces, and any two adjacent interfaces of the rear switch valve (V5) are connected in the first flow channel (L3) and are located between the sample injector (S5) and the first tee joint (T1).

9. The liquid chromatography system of claim 8, wherein the rear switch valve (V5) is provided with a first interface (m1), a second interface (n2), a third interface (x3), a fourth interface (y4), a fifth interface (s5) and a sixth interface (r6); the filter or the protector (B2) is connected between the second interface (n2) and the fifth interface (s5); both of the first waste liquid flow channel (L14) and the first flow channel (L13) are divided into two segments; the fourth interface (y4) is connected with one segment (L14') of the first waste liquid flow channel, and the third interface (x3) is connected with the other segment (L15) of the first waste liquid flow channel; and the first interface (m1) is connected with one segment (L13') of the first flow channel, and the sixth interface (r6) is connected with the other segment (L17) of the first flow channel.

10. The liquid chromatography system of claim 2, wherein the direction switch valve (V1) comprises a first interface (a7), a second interface (b8), a third interface (c9), a fourth interface (d10), a fifth interface (e11), a sixth interface (f12), a seventh interface (g13), an eighth interface (h14), a ninth interface (i15) and a tenth interface (j16), the cleaning solution storage ring (B1) is connected between the fifth interface (e11) and the tenth interface (j16), the first interface (a7) is connected with the first flow channel (L3), the second interface (b8) is connected with the first pipeline (L8) which connects with the one end of the first chromatographic column (C1), the third interface (c9) and the sixth interface (f12) are separately connected with the waste liquid flow channels, the fourth interface (d10) is connected with the middle communication pipeline (L13), the seventh interface (g13) is in a plugged state, and the ninth interface (i15) is connected with the cleaning flow channel (L25).

11. The liquid chromatography system of claim 3, wherein the direction switch valve (V1) comprises a first interface (a7), a second interface (b8), a third interface (c9), a fourth interface (d10), a fifth interface (e11), a sixth interface (f12), a seventh interface (g13), an eighth interface (h14), a ninth interface (i15) and a tenth interface (j16), the cleaning solution storage ring (B1) is connected between the fifth interface (e11) and the tenth interface (j16), the first interface (a7) is connected with the first flow channel (L3), the second interface (b8) is connected with the first pipeline (L8) which connects with the one end of the first chromatographic column (C1), the third interface (c9) and the sixth interface (f12) are separately connected with the waste liquid flow channels, the fourth interface (d10) is connected with the middle communication pipeline (L13), the seventh interface (g13) is in a plugged state, and the ninth interface (i15) is connected with the cleaning flow channel (L25).

12. The liquid chromatography system of claim 2, wherein the multi-flow channel switch valve (V2) is provided with a first port (a17), a second port (b18), a third port (c19), a fourth port (d20), a fifth port (e21), a sixth port (f22), a seventh port (g23), an eighth port (h24), a ninth port (i25) and a tenth port (j26), the third port (c19) is in a plugged state, the first port (a17) is connected with the second pipeline (L9) which connects with the other end of the first chromatographic column (C1), the second port (b18) is connected with the sixth port (f22) through the connection pipeline (L19), the ninth port (i25) is connected with the third pipeline (L12) which connects with the one end of the middle chromatographic column (C2), the fourth pipeline (L11) which connects with the other end of the middle chromatographic column (C2) is connected with the connection pipeline (L19) through a second tee joint (T2), the seventh port (g23) is connected with the second flow channel (L21), and the eighth port (h24) is connected with the analysis flow channel (L22).

13. The liquid chromatography system of claim 3, wherein the multi-flow channel switch valve (V2) is provided with a first port (a17), a second port (b18), a third port (c19), a fourth port (d20), a fifth port (e21), a sixth port (f22), a seventh port (g23), an eighth port (h24), a ninth port (i25) and a tenth port (j26), the third port (c19) is in a plugged state, the first port (a17) is connected with the second pipeline (L9) which connects with the other end of the first chromatographic column (C1), the second port (b18) is connected with the sixth port (f22) through the connection pipeline (L19), the ninth port (i25) is connected with the third pipeline (L12) which connects with the one end of the middle chromatographic column (C2), the fourth pipeline (L11) which connects with the other end of the middle chromatographic column (C2) is connected with the connection pipeline (L19) through a second tee joint (T2), the seventh port (g23) is connected with the second flow channel (L21), and the eighth port (h24) is connected with the analysis flow channel (L22).

14. The liquid chromatography system of claim 12, wherein the fifth port (e21) is in a plugged state.

15. The liquid chromatography system of claim 13, wherein the fifth port (e21) is in a plugged state.

16. The liquid chromatography system of claim 12, wherein the first modulation flow channel (L17) is connected with the fifth port (e21) of the multi-flow channel switch valve (V2); one end of the second modulation flow channel (L18) is connected with the fourth port (d20) of the multi-flow channel switch valve (V2), and the other end of the second modulation flow channel (L18) is connected with the first flow channel (L3) through a first tee joint (T1) and is connected with the flow channel located behind the sample injector (S5).

17. The liquid chromatography system of claim 13, wherein the first modulation flow channel (L17) is connected with the fifth port (e21) of the multi-flow channel switch valve (V2); one end of the second modulation flow channel (L18) is connected with the fourth port (d20) of the multi-flow channel switch valve (V2), and the other end of the second modulation flow channel (L18) is connected with the first flow channel (L3) through a first tee joint (T1) and is connected with the flow channel located behind the sample injector (S5).

18. The liquid chromatography system of claim 16, wherein the rear switch valve (V5) is provided with a plurality of interfaces, and any two adjacent interfaces of the rear switch valve (V5) are connected in the first flow channel (L3) and are located between the sample injector (S5) and the first tee joint (T1).

19. The liquid chromatography system of claim 17, wherein the rear switch valve (V5) is provided with a plurality of interfaces, and any two adjacent interfaces of the rear switch valve (V5) are connected in the first flow channel (L3) and are located between the sample injector (S5) and the first tee joint (T1).

20. The liquid chromatography system of claim 18, wherein the rear switch valve (V5) is provided with a first interface (m1), a second interface (n2), a third interface (x3), a fourth interface (y4), a fifth interface (s5) and a sixth interface (r6); the filter or the protector (B2) is connected between the second interface (n2) and the fifth interface (s5); both of the first waste liquid flow channel (L14) and the first flow channel (L13) are divided into two segments; the fourth interface (y4) is connected with one segment (L14') of the first waste liquid flow channel, and the third interface (x3) is connected with the other segment (L15) of the first waste liquid flow channel; and the first interface (m1) is connected with one segment (L13') of the first flow channel, and the sixth interface (r6) is connected with the other segment (L17) of the first flow channel.

21. The liquid chromatography system of claim 19, wherein the rear switch valve (V5) is provided with a first interface (m1), a second interface (n2), a third interface (x3), a fourth interface (y4), a fifth interface (s5) and a sixth interface (r6); the filter or the protector (B2) is connected between the second interface (n2) and the fifth interface (s5); both of the first waste liquid flow channel (L14) and the first flow channel (L13) are divided into two segments; the fourth interface (y4) is connected with one segment (L14') of the first waste liquid flow channel, and the third interface (x3) is connected with the other segment (L15) of the first waste liquid flow channel; and the first interface (m1) is connected with one segment (L13') of the first flow channel, and the sixth interface (r6) is connected with the other segment (L17) of the first flow channel.

\* \* \* \* \*